(12) United States Patent
Sue et al.

(10) Patent No.: US 7,990,631 B2
(45) Date of Patent: Aug. 2, 2011

(54) LENS DRIVE DEVICE, SPRING MEMBER AND MANUFACTURING METHODS THEREFOR

(75) Inventors: Takeshi Sue, Nagano (JP); Daisuke Higuchi, Nagano (JP); Yuichi Takei, Nagano (JP); Yukio Furuya, Nagano (JP); Shinji Minamisawa, Nagano (JP)

(73) Assignee: Nidec Sankyo Corporation (JP)

( * ) Notice: Subject to any disclaimer, the term of this patent is extended or adjusted under 35 U.S.C. 154(b) by 201 days.

(21) Appl. No.: 12/271,413

(22) Filed: Nov. 14, 2008

(65) Prior Publication Data

US 2009/0122420 A1    May 14, 2009

(30) Foreign Application Priority Data

Nov. 14, 2007   (JP) ................................ 2007-295362
Nov. 14, 2007   (JP) ................................ 2007-295687

(51) Int. Cl.
*G02B 7/02*      (2006.01)
(52) U.S. Cl. ......... 359/819; 359/811; 359/813; 359/814
(58) Field of Classification Search .................. 359/811, 359/813, 814, 819, 821, 822, 823, 824
See application file for complete search history.

(56) References Cited

U.S. PATENT DOCUMENTS

2008/0117536 A1*   5/2008   Higuchi ........................ 359/824

FOREIGN PATENT DOCUMENTS

| JP | 2006-201525 | 8/2006 |
| JP | 2006-227103 | 8/2006 |

* cited by examiner

*Primary Examiner* — Timothy J Thompson
(74) *Attorney, Agent, or Firm* — Cantor Colburn LLP

(57) ABSTRACT

A lens drive device may include a movable body movable in an optical axis direction, a support body supporting the movable body through a spring member which may include spring pieces electrically separated from each other, formed with a coil connecting part to which one of a winding start part and a winding end part of the coil is electrically connected. The movable body is provided with an accommodating part for accommodating the coil connecting part. The spring member may include a plate spring-shaped arm part connecting a support body side fixing part with a movable body side fixing part and the arm part is provided with a laser cut portion formed by a laser in a part of an edge part of the arm part. An edge part of the arm part except the laser cut portion may be a cut portion formed by press working or etching processing.

18 Claims, 12 Drawing Sheets

LENS DRIVE DEVICE, SPRING MEMBER AND MANUFACTURING METHODS THEREFOR

CROSS REFERENCE TO RELATED APPLICATION

The present invention claims priority under 35 U.S.C. §119 to Japanese Application No. 2007-295362 filed Nov. 14, 2007 and Japanese Application No. 2007-295687 filed Nov. 14, 2007, the entire contents of both of which are incorporated herein by reference.

FIELD OF THE INVENTION

At least an embodiment of the present invention may relate to a lens drive device in which a lens is moved in an optical axis direction to form an image of an object to be photographed. Further, at least an embodiment of the present invention may relate to a lens drive device in which a movable body provided with a lens is movably supported in an optical axis direction by a spring member, a spring member which is provided with an arm part having a plate spring shape, and manufacturing methods for the lens drive device and the spring member.

BACKGROUND OF THE INVENTION

As cell phones with cameras in which a camera is mounted have become popular in recent years, chances photographing various objects to be photographed by using the cell phone have increased. For example, there is a case that an object such as a friend or landscape which is apart from a lens of a camera to some extent is photographed (normal photographing) and, alternatively, there is a case that an object such as a timetable for bus or petals of a flower at a position near the lens of the camera is photographed (close-up photographing).

In the close-up photographing (macro-photographing), a lens position of a camera is required to locate at a position nearer on an object side than a lens position at the time of normal photographing. Therefore, this type of photographing lens system is provided with a drive mechanism for driving a lens to move in the optical axis direction. The drive mechanism is driven by changing a switch to move a lens in the optical axis direction (see, for example, Japanese Patent Laid-Open No. 2006-227103).

An imaging device which is disclosed in the above-mentioned Patent Reference includes a lens-barrel on which an imaging optical system is disposed, a movable part which is provided with a movable lens and which is movable with respect to the lens-barrel in an optical axis direction, a linear actuator for moving the movable part in the optical axis direction, a holding part which holds the movable part, and a plurality of spring parts which are capable of being elastically deformed. Further, the movable part includes a lens holder, a drive coil and a coil holder. In the structure as described above, the movable part can be moved from an infinity side to a macro-end side by means of driving the linear actuator through energization to the drive coil. As a result, the movable part can be stopped at a desired position.

End parts of the drive coil are wound around coil connecting protruded parts which are formed on a coil holder. Further, the coil connecting protruded parts are formed so as to protrude upward and downward on an upper and a lower end parts of the coil holder. In addition, after the drive coil has been wound around the coil connecting protruded part, in order to enhance a conducting function or, in order to securely connect the drive coil to the coil connecting protruded part, soldering is commonly performed to the drive coil.

However, when the drive coil and the coil connecting protruded part are electrically connected by soldering, the soldered portion has heaped up and thus a design space is narrowed. In other words, when the soldered portion has heaped up, the design space is narrowed because a distance between the soldered portion and its opposite part is required to secure. In addition, in order to secure a sufficient distance between the soldered portion and its opposite part, a thickness and a size of the device is required to increase, which does not meet recent demands for miniaturization of the device.

On the other hand, a camera which is mounted on a cell phone with a camera or a digital camera includes a lens drive device for moving a lens in an optical axis direction. The lens drive device includes a support body, a movable body provided with a lens, and a spring member which movably supports the movable body along an optical axis of the lens. The spring member includes a support body side fixing part which is fixed to the support body, a movable body side fixing part which is fixed to the movable body, and a plurality of arm parts which are formed in a plate spring shape to connect the movable body side fixing part with the support body side fixing part (see, Japanese Patent Laid-Open No. 2006-201525).

The spring member is commonly manufactured by means of that a thin plate is cut off by wet etching processing which utilizes a photo lithography technique.

In the lens drive device described above, the movable body is driven in an optical axis direction by a magnetic drive mechanism which is structured between the support body and the movable body, and its movement is restricted by the spring member to determine a stop position of the movable body. Therefore, a high degree of accuracy is required for a spring constant of the arm part of the spring member. However, a spring member having a spring constant with a high degree of accuracy is not obtained by a conventional manufacturing method. This problem is not limited to the spring member used in the lens drive device but may occur in all spring members which are used in apparatuses in which a position of a movable body is restricted by a spring member. Especially in the lens drive device, the spring member having a thinner thickness and the arm part having a thinner width are strictly demanded as its size and height are reduced. Therefore, also from this standpoint, control of its spring constant becomes difficult.

SUMMARY OF THE INVENTION

In view of the problems described above, at least an embodiment of the present invention may advantageously provide a lens drive device which is capable of preventing a design space from being narrowed by a thickness of soldered portion and thus which is capable of reducing a height of the device.

Further, at least an embodiment of the present invention may advantageously provide a lens drive device, which is provided with a spring member in which accuracy of a spring constant of its plate spring-shaped arm part is improved, and provide the spring member and their manufacturing methods.

In order to solve the problems described above, at least an embodiment of the present invention provides as follows.

According to at least an embodiment of the present invention, there may be provided a lens drive device including a movable body which is provided with a lens and which is movable in an optical axis direction, a support body which supports the movable body through a spring member, and a magnetic drive mechanism which includes a coil that is held on the movable body and which drives the movable body in the optical axis direction. The spring member includes a plurality of spring pieces which are electrically separated, the spring piece is formed with a coil connecting part to which one of a winding start part and a winding end part of the coil is electrically connected, the coil connecting part is capable of being bent, and the movable body is provided with an accommodating part for accommodating the coil connecting part which has been bent.

According to the embodiment of the present invention, the lens drive device includes the movable body, the support body, the magnetic drive mechanism, and a plurality of spring pieces which are electrically separated, and the spring piece is formed with a coil connecting part to which one of a winding start part and a winding end part of the coil is electrically connected. In addition, the coil connecting part is capable of being bent, and the movable body is provided with an accommodating part for accommodating the coil connecting part which has been bent. Therefore, the solder applied to the coil is accommodated into the accommodating part together with the coil connecting part.

As a result, even when the solder has been heaped up, a distance between the soldered portion and its opposite part is not required to narrow by bending the coil connecting part. Accordingly, a design space is prevented from being narrowed and thus a height of the device can be reduced. Further, in a case that the entire solder applied to the coil is accommodated in the accommodating part by bending the coil connecting part, a sufficient space to the opposite part can be secured and, as a result, reliability for a drop strength in an apparatus such as a cell phone with a camera on which the lens drive device is mounted can be improved.

In the lens drive device described above, it is preferable that the coil connecting part is disposed in a vicinity of a positioning hole for positioning the spring piece to the movable body.

According to the embodiment of the present invention, the coil connecting part is disposed in a vicinity of a positioning hole for positioning the spring piece to the movable body. Therefore, the spring piece is prevented from being floated due to bending of the coil connecting part. In other words, even when the spring piece near the positioning hole has been bent, the spring piece is prevented from being floated by means of that a projection of the movable body is inserted into the positioning hole of the spring piece and fixed. Therefore, the spring piece is prevented from being floated due to bending of the coil connecting part by arranging the coil connecting part near the positioning hole.

In the lens drive device, it may be structured that the movable body includes a sleeve which is provided with the lens, the sleeve is mounted movably in the optical axis direction by a first plate spring which is mounted on a front end face side in the optical axis direction and by a second plate spring which is mounted on a rear end face side in the optical axis direction, one of the first plate spring and the second plate spring comprises two spring pieces which are electrically separated from each other, and the two spring pieces are formed with coil connecting parts to which the winding start part and the winding end part of the coil are electrically connected.

In this case, when each of the two spring pieces includes a circular arc-shaped sleeve side fixing part mounted on the sleeve, a support body side fixing part mounted on the support body, and an arm part which is formed between the sleeve side fixing part and the support body side fixing part for restricting movement in the optical axis direction of the sleeve, it is preferable that the coil connecting part is formed at a tip end part of the circular arc-shaped sleeve side fixing part, and an accommodating recessed part for accommodating the coil connecting part is formed on an end face in the optical axis direction of the sleeve.

Further, it is preferable that each of the two spring pieces is formed with a positioning hole for positioning the spring piece to the sleeve in a vicinity of the tip end part of the sleeve side fixing part, and the sleeve side fixing part of the spring piece is positioned and fixed to the sleeve through the positioning hole and the coil connecting part is accommodated in the accommodating recessed part.

In addition, in the lens drive device described above, when the coil connecting part is adhesively fixed to the accommodating part with an adhesive, the coil connecting part is prevented from moving due to dropping, vibration and impact and thus possibility of coil disconnection can be reduced. In this case, it is preferable that the coil connecting part includes a coil binding part where the coil is bound and soldered, the adhesive is applied so as to cover at least the coil binding part and a portion where an insulating layer of the coil has been melted at the time of soldering, and the coil connecting part and the coil are adhesively fixed to the accommodating part with the adhesive. According to this structure, a boundary part of a portion where the insulating layer of the coil has been melted at the time of soldering is also covered by the adhesive together with the coil connecting part and fixed to the accommodating part and thus possibility of coil disconnection can be further reduced.

Next, according to at least an embodiment of the present invention, there may be provided a lens drive device including a support body, a movable body which is provided with a lens, a spring member which movably supports the movable body along an optical axis of the lens. The spring member includes a support body side fixing part which is fixed to the support body, a movable body side fixing part which is fixed to the movable body, and a plurality of plate spring-shaped arm parts which connects the support body side fixing part and the movable body side fixing part. At least one of the plurality of the arm parts is provided with a cut portion formed by a laser in an edge part.

In other words, according to at least an embodiment of the present invention, there may be provided a manufacturing method for a lens drive device having a support body, a movable body provided with a lens, and a spring member movably supporting the movable body along an optical axis of the lens. The spring member includes a support body side fixing part fixed to the support body, a movable body side fixing part fixed to the movable body, and a plurality of plate spring-shaped arm parts which connects the support body side fixing part and the movable body side fixing part. In order to manufacture the spring member, cutting a thin plate to form the support body side fixing part, the movable body side fixing part and the plurality of the arm parts, measuring a spring constant of the arm part which is formed by the cutting, and performing laser trimming in which a shape and/or a dimension of the arm part are changed by a laser according to a measurement result of the spring constant to correct the spring constant.

According to the embodiment of the present invention, the support body side fixing part, the movable body side fixing part and the plurality of the arm parts are formed by cutting, and then a spring constant of the arm part is measured, and then laser trimming is performed according to a measurement result of the spring constant to correct the spring constant. Therefore, even when a spring constant having a low degree of accuracy is obtained at the time of cutting, after laser trimming, the spring member is provided with a spring constant having a high degree of accuracy. Accordingly, when the position of the movable body is controlled by an urging force of the spring member, accuracy of the spring constant of the spring member is high and thus the position of the movable body can be controlled with a high degree of accuracy.

In the lens drive device to which the present invention is applied, an edge part of the arm part except the cut portion formed by the laser is a cut portion by press working or etching processing in which a photo lithography technique is used. In other words, in the manufacturing method for the lens drive device to which the present invention is applied, the cutting is performed by press working to the thin plate or by etching processing using a photo lithography technique to form the support body side fixing part, the movable body side fixing part and the plurality of the arm parts.

According to the embodiment of the present invention, it is preferable that the cut portion of the spring member formed by the laser is formed so that a cut-out part for forming the arm part is extended to lengthen a length dimension of the arm part. According to this structure, laser trimming is easily performed even when a width dimension of the arm part is narrow in comparison with a case mat the shape of the arm part is changed.

According to the embodiment of the present invention, it may be structured that the arm part is extended in a circumferential direction, the spring member is provided with a first slit part, which is cut out on an inner side of the arm part toward a connecting portion of the arm part with the movable body side fixing part, and a second slit part which is cut out on an outer side of the arm part toward a connecting portion of the arm part with the support body side fixing part, and the cut portion by the laser is formed so that the first slit part and/or the second slit part are extended to lengthen a length dimension of the arm part. According to this structure, in comparison with the case that the shape of the arm part is changed, laser trimming is easily performed even when a width dimension of the arm part is narrow.

In this case, it is preferable that in each of the plurality of the arm parts, the first slit part located on the inner side of the arm part and the second slit part, which is located on the outer side of another arm part that is formed at an adjacent position in the circumferential direction with respect to the arm part, are formed as a continuous cut-out part which is connected in the circumferential direction. According to this structure, when the spring member is to be manufactured from a thin plate, a cutting pattern to the thin plate is simplified and thus cutting process of the spring member can be simplified and accuracy of the cutting patterned be enhanced.

According to the embodiment of the present invention, it is preferable that the cutting portion by the laser is formed so that the second slit part is extended to lengthen the length dimension of the arm part. The shape and the width dimension of the connecting part of the arm part with the movable body side fixing part are often set in consideration of its strength and the like. Therefore, in a case that the first slit part is extended by using a laser, a strength of the connecting part of the arm part with the movable body side fixing part may be deteriorated but when the second slit part is extended by a laser, the above-mentioned deterioration is prevented.

According to the embodiment of the present invention, it may be structured that the movable body side fixing part is formed in a ring-shaped frame shape and with which a plurality of arm parts are connected, and the arm part is curved along the movable body side fixing part.

According to at least an embodiment of the present invention, there may be provided a spring member including a support body side fixing part which is fixed to a support body, a movable body side fixing part which is fixed to a movable body, and a plate spring-shaped arm part which connects the support body side fixing part with the movable body side fixing part. The arm part is provided with a laser cut portion which is formed by a laser in a part of an edge part of the arm part.

In other words, according to at least an embodiment of the present invention, there may be provided a manufacturing method for a spring member having a support body side fixing part fixed to a support body, a movable body side fixing part fixed to a movable body, and a plate spring-shaped arm part which connects the support body side fixing part with the movable body side fixing part. In order to manufacture the spring member, a thin plate is cut to form the support body side fixing part, the movable body side fixing part and the plurality of the arm parts, a spring constant of the arm part which is formed by the cutting is measured, and laser trimming is performed in which a shape and/or a dimension of the arm part are changed by a laser according to a measurement result of the spring constant to correct the spring constant.

According to the embodiment of the present invention, a thin plate is cut to form the support body side fixing part, the movable body side fixing part and the plurality of the arm parts, a spring constant of the arm part which is formed by the cutting is measured, and laser trimming is performed in which a shape and/or a dimension of the arm part are changed by a laser according to a measurement result of the spring constant to correct the spring constant. Therefore, even when a spring constant having a low degree of accuracy is obtained at the time of cutting, after laser trimming, the spring member is provided with a spring constant having a high degree of accuracy.

In the spring member to which the present invention is applied, an edge part of the arm part except the laser cut portion is a cut portion formed by press working or etching processing in which a photo lithography technique is used. In other words, in the manufacturing method for the spring member in accordance with the present invention, the cutting is performed by press working to the thin plate or by etching processing using a photo lithography technique to form the support body side fixing part, the movable body side fixing part and the plurality of the arm parts.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of the present invention will be described below with reference to the accompanying drawings.

Figure 1:
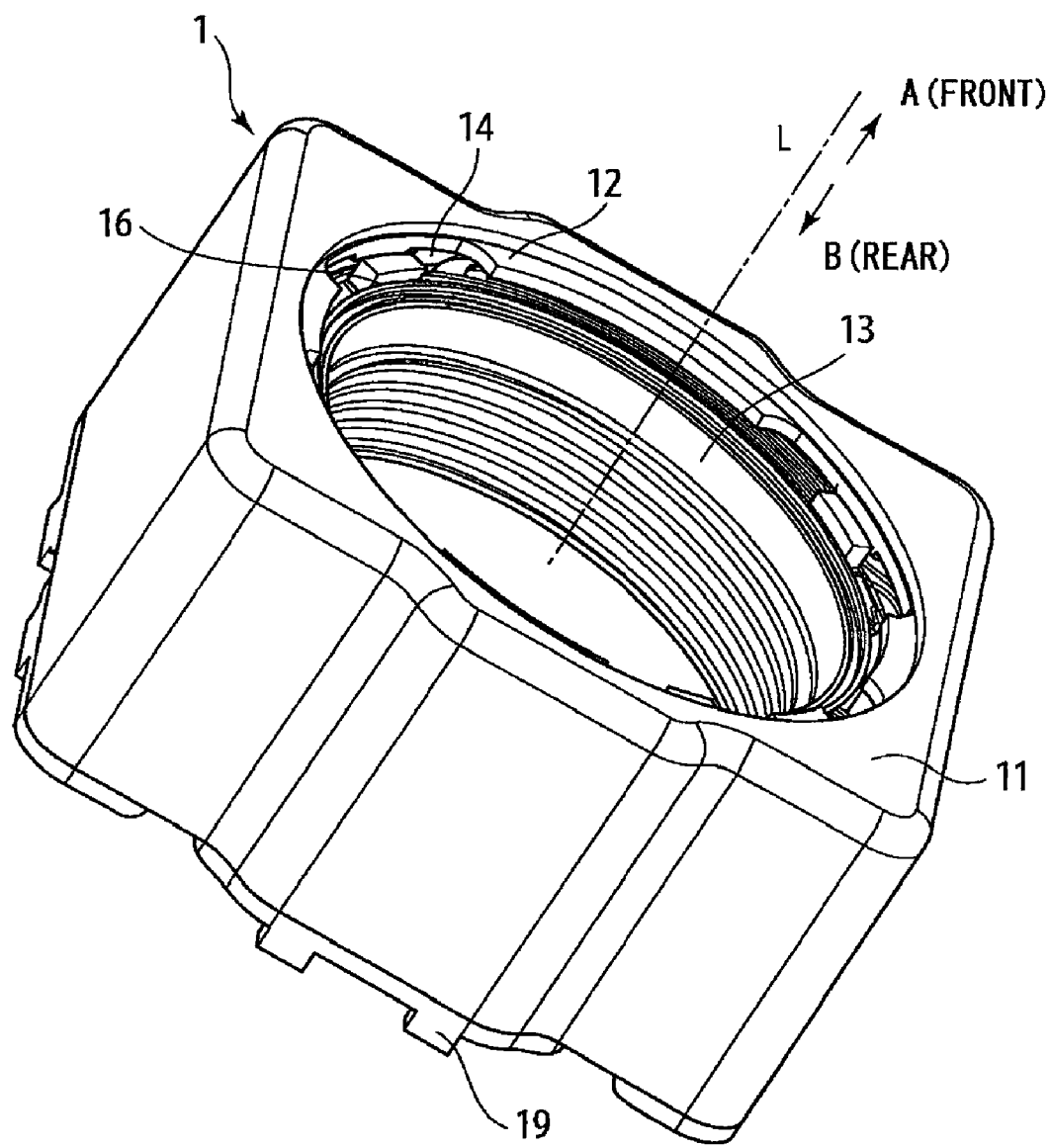
FIG. 1 is a perspective outward appearance view showing a lens drive device in accordance with an embodiment of the present invention.
Figure 2:
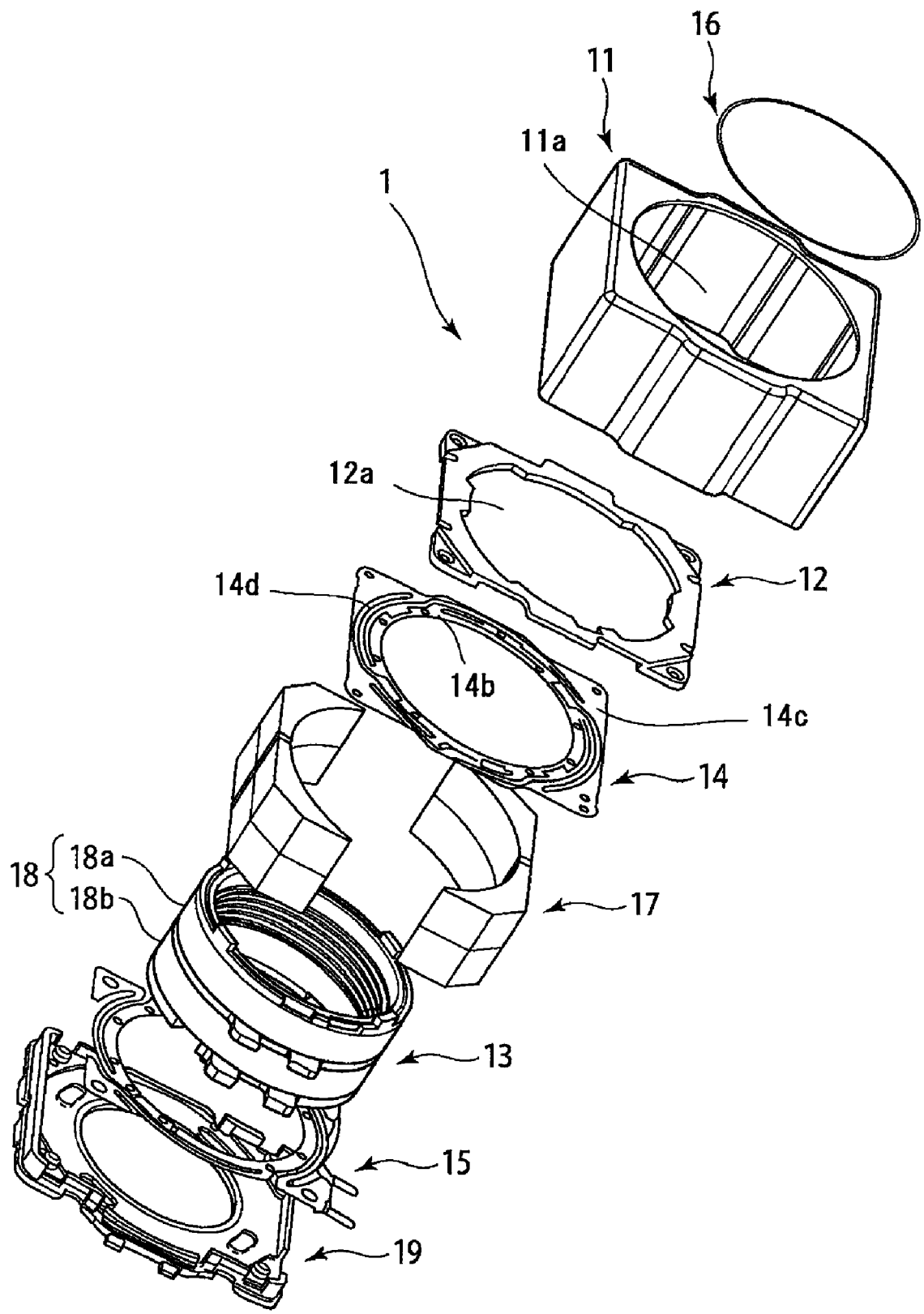
FIG. 2 is an exploded perspective view showing a mechanical structure of a lens drive device in accordance with an embodiment of the present invention.

FIG. 1 is a perspective outward appearance view showing a lens drive device 1 in accordance with at least an embodiment of the present invention FIG. 2 is an exploded perspective view showing a mechanical structure of a lens drive device 1 in accordance with at least an embodiment of the present invention.

In FIGS. 1 and 2, the lens drive device 1 includes a yoke 11, a cover 12, a sleeve 13, a first plate spring 14, a second plate spring 15, a wire spring 16, a magnet 17, a coil 18 (a first coil 18a and a second coil 18b) and a holder 19.

In this embodiment, a lens barrel into which a lens is assembled is not shown in the drawings. The lens drive device 1 moves the sleeve 13 along an optical axis "L" direction in both directions, i.e., an "A"-direction (front side) approaching to an object to be photographed (imaging object) and a "B"-direction (rear side) approaching to an opposite side to the object to be photographed (image side) (see FIG. 1). Further, the sleeve 13 which holds the lens barrel (not shown) into which one or plural lenses are assembled is structured so as to be movable in the direction of the optical axis "L" together with a wire spring 16 and the like, which correspond to an example of the "movable body". Further, the yoke 11, the cover 12, the holder 19 and the like correspond to an example of the "support body" which supports the sleeve 13 and the like so as to be movable in the direction of the optical axis "L" through the first plate spring 14 and the second plate spring 15. Further, the sleeve 13 and the like are driven in the direction of the optical axis "L" by a "magnetic drive mechanism" which is provided with the coil 18 and the magnet 17.

The yoke 11 is structured of a ferromagnetic plate such as a steel plate. Further, the yoke 11 is exposed as the front face and the side face of the lens drive device 1 and a circular incident aperture 11a is formed at its center for taking a reflected light from an object to be photographed to the lens. The cover 12 is mounted on the yoke 11 and a circular incident aperture 12a is formed at its center for taking the reflected light from the object to be photographed to the lens. The holder 19 holds an image sensor element (not shown) on the image side.

The coil 18 is structured of the first coil 18a and the second coil 18b, which are disposed in two layers in the direction of the optical axis "L", and each is formed in a circular ring shape. The first coil 18a and the second coil 18b are wound around an outer peripheral face of the sleeve 13 so as to have a predetermined clearance to each other. Further, eight magnets 17 are disposed to be superposed in two layers in the optical axis direction. Magnets 17 on the front side of the respective magnets 17 are faced with an outer peripheral side of the first coil 18a and the magnets 17 on the rear side are faced with an outer peripheral side of the second coil 18b and, as shown in FIG. 2, the eight magnets 17 are fixed to four corner parts of an inner peripheral face of the yoke 11 whose outer shape is formed in a roughly rectangular shape.

In this embodiment, each of the magnets 17 is magnetized so that its inside face and its outside face are magnetized to be different from each other. For example, four magnets 17 disposed on the front side are magnetized so that their inside faces are magnetized to be an "N"-pole and their outside faces are magnetized to be an "S"-pole, and four magnets 17 disposed on the rear side are magnetized so that their inside faces are magnetized to be an "S"-pole and their outside faces are magnetized to be an "N"-pole.

Figure 3:
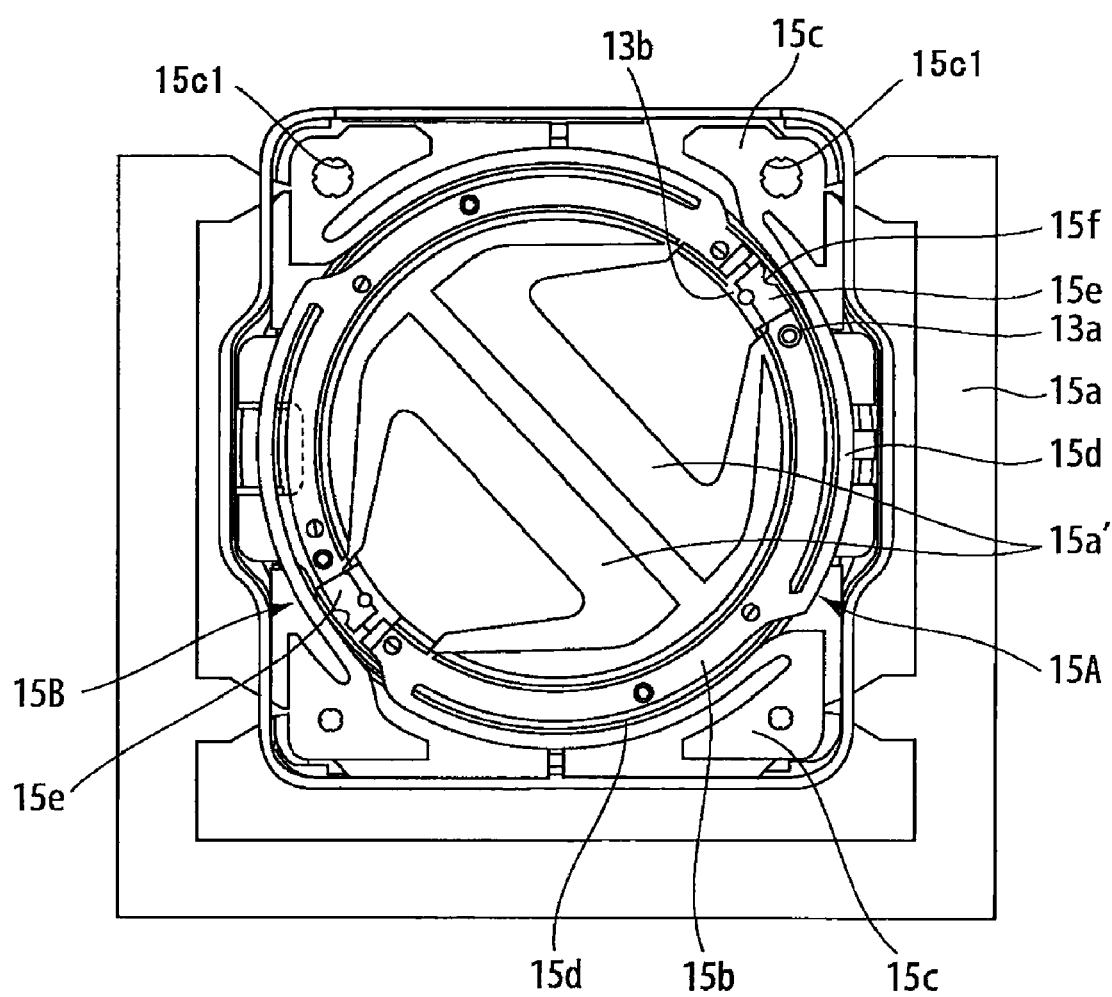
FIG. 3 is a plan view showing a lens drive device from which a holder is removed and which is viewed from its rear side.
Figure 4:
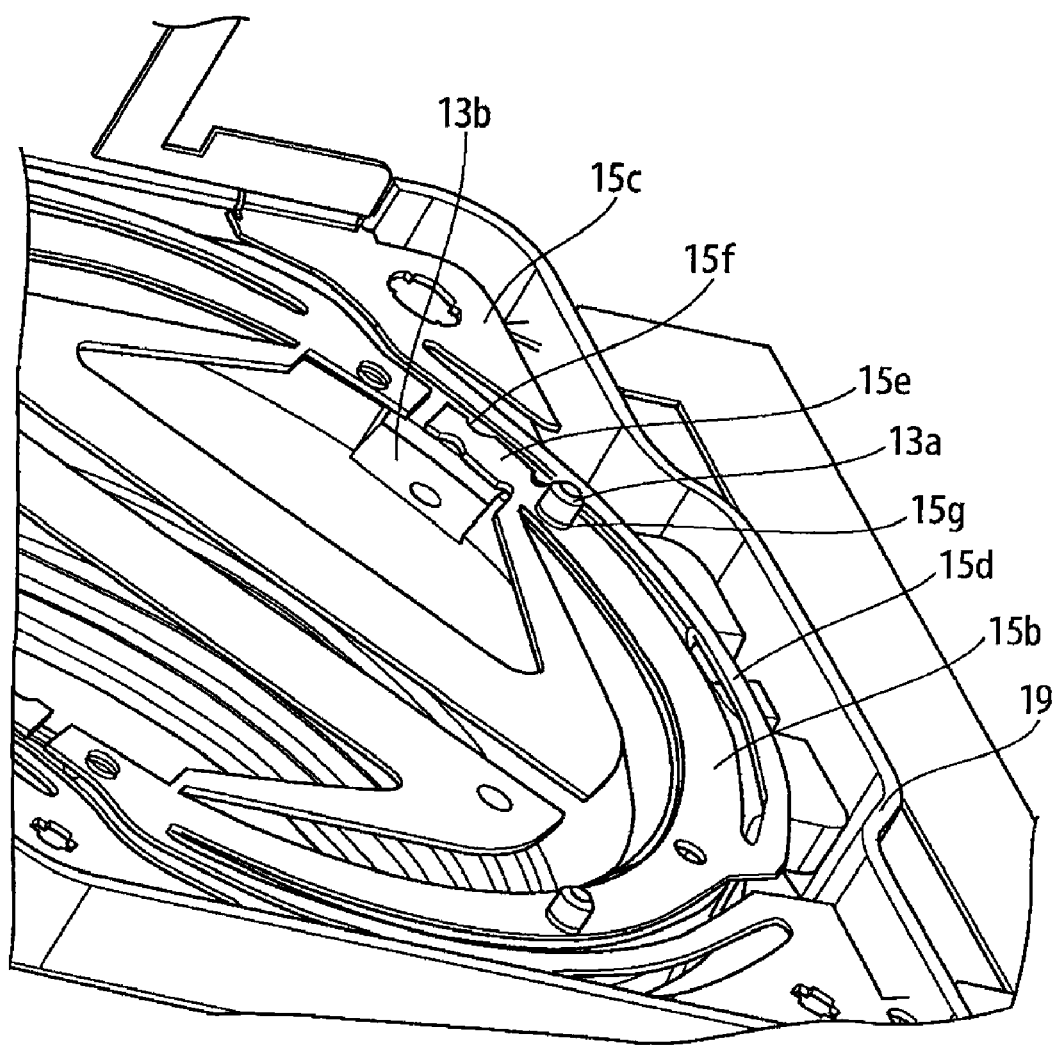
FIG. 4 is an enlarged perspective view showing a coil connecting part and its surroundings in the lens drive device shown in FIG. 3.

The first plate spring 14 and the second plate spring 15 are formed of a metal thin plate and their thicknesses in the direction of the optical axis "L" is set to be the same. As shown in FIG. 2, the first plate spring 14 includes a sleeve side mounting part 14b, which is formed in a circular arc shape and mounted on a front end face in an optical axis direction of the sleeve 13, a cover side mounting part 14c which is mounted on the cover 12 made of resin, and arm parts 14d which are formed between the sleeve side mounting part 14b and the cover side mounting part 14c for restricting movement in the optical axis direction of the sleeve 13. The first plate spring 14 is mounted on the front end face of the sleeve 13, for example, by being welded, adhesively bonded or the like. In this embodiment, as shown in FIGS. 3 and 4, the second plate spring 15 comprises two spring pieces 15A and 15B which are electrically separated from each other. Each of the spring pieces 15A and 15B includes a sleeve side mounting part 15b, which is formed in a circular arc shape and mounted on a rear end face in the optical axis direction of the sleeve 13, a holder side mounting part 15c which is mounted on the holder 19 made of resin, and arm parts 15d which are formed between the sleeve side mounting part 15b and the holder side mounting part 15c for restricting movement in the optical axis direction of the sleeve 13.

The yoke 11 is set to be larger than a dimension in the optical axis direction of a region where the first coil 18a and the second coil 18b are disposed and a dimension in the optical axis direction of the magnets 17. Therefore, leakage flux is reduced which is generated from a magnetic path structured between the front side magnets 17 and the first coil 18a and generated from a magnetic path structured between the rear side magnets 17 and the second coil 18b. As a result, linearity between a moving amount of the sleeve 13 and an electric current supplied through the first coil 18*a* and the second coil 18*b* can be improved.

The lens drive device 1 is provided with a circular ring shaped wire spring 16. The wire spring 16 applies an urging force in the direction of the optical axis "L" to the sleeve 13 on the basis of a magnetic attractive force acting between the magnets 17 and the wire spring 16. Therefore, the movable body (sleeve 13, etc.) can be prevented from being displaced by its own weight at a not-energized time of the coil and, as a result, the movable body (sleeve 13, etc.) is capable of maintaining a desired posture. In addition, impact resistance can be also improved.

In the lens drive device 1 in accordance with an embodiment of the present invention, the second plate spring 15 serves as a medium when an electric current from an external power supply is supplied to the coil 18 and thus the second plate spring 15 is electrically connected to a winding start part and a winding end part of the coil 18. In other words, the second plate spring 15 includes two spring pieces 15A and 15B which are electrically separated from each other. The spring pieces 15A and 15B are formed with coil connecting parts 15*e* and 15*e*' to which either one of the winding start part and the winding end part of the coil 18 is electrically connected (see FIG. 3). The coil connecting parts 15*e* and 15*e*' will be described in detail below with reference to FIGS. 3 through 5.

Figure 5:
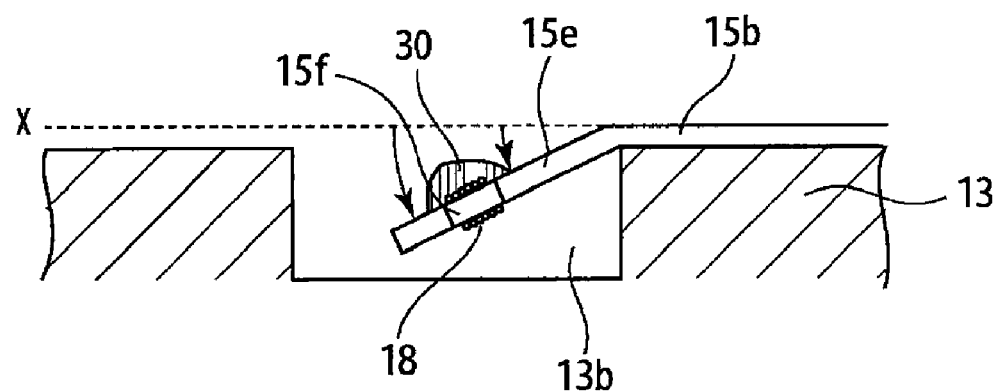
FIG. 5 is an explanatory side view showing a state when a coil connecting part has been bent.

FIG. 3 is a plan view showing the lens drive device 1 from which the holder 19 is removed and which is viewed from its rear side. FIG. 4 is an enlarged perspective view showing the coil connecting part 15*e* and its surroundings in the lens drive device 1 shown in FIG. 3. FIG. 5 is an explanatory side view showing a state when the coil connecting part 15*e* has been bent. In FIG. 3, the second plate spring 15 is connected with a frame 15*a* and connecting parts 15*a*', which will be removed at the time of completion.

As shown in FIGS. 3 and 4, the second plate spring 15 includes the sleeve side mounting part 15*b*, which is formed in a circular arc shape and mounted on the rear end face in the optical axis direction of the sleeve 13, the holder side mounting part 15*c* which is mounted on the holder 19 made of resin, and arm parts 15*d* which are formed between the sleeve side mounting part 15*b* and the holder side mounting part 15*c* for restricting movement in the optical axis direction of the sleeve 13.

Further, as described above, the second plate spring 15 comprises two spring pieces 15A and 15B which are electrically separated from each other. Each of the spring pieces 15A and 15B includes the sleeve side mounting part 15*b*, two holder side mounting parts 15*c* and two arm parts 15*d*. In FIG. 3, one sleeve side mounting part 15*b*, two holder side mounting parts 15*c* and two arm parts 15*d* provided in the spring piece 15A are shown with notational symbols but the spring piece 15B is shown without notational symbols. Further, the arm part 15*d* is extended to the vicinity of the holder side mounting part 15*c* which is disposed on an adjacent corner part.

The holder side mounting part 15*c* is formed with a hole 15*c*1 into which a projection (not shown) of the holder 19 is inserted and it is positioned to the holder 19 through the hole 15*c*1. On the other hand, the sleeve side mounting part 15*b* is formed with a positioning hole 15*g* (see FIG. 4) with which a protruded part 13*a* formed on the rear end face of the sleeve 13 is engaged. In FIG. 3, four protruded parts 13*a* which are formed on the rear end face of the sleeve 13 are inserted into the four positioning holes 15*g* formed in the sleeve side mounting part 15*b* and positioned and fixed.

In this embodiment, the coil connecting part 15*e* and the coil connecting part 15*e*' are formed at one end of tip end parts of the sleeve side mounting parts 15*b* of the divided spring pieces 15A and 15B. Further, the coil connecting part 15*e* is formed with a coil binding part 15*f* which is cut in a semicircular shape and either one of the winding start part or the winding end part of the coil 18 is bound to the coil binding part 15*f*. After the coil 18 has been bound, soldering is performed on the bound portion of the coil 18 and then, the coil connecting part 15*e* including a heaped-up solder 30 (see FIG. 5) is bent so that they are accommodated in an accommodating recessed part 13*b* as an accommodating part for the coil connecting part 15*e*, which is formed on the rear end face of the sleeve 13. The coil connecting part 15*e*' is similarly structured. The accommodating recessed part 13*b* is formed as a definite recessed part because it is formed in a shape that a part of the rear end face of the sleeve 13 is cut off. However, the accommodating recessed part 13*b* may be formed in another shape, for example, in a stepped shape as an accommodating part when the coil connecting part 15*e* is accommodated on the sleeve 13 side with respect to the sleeve side mounting part 15*b* mounted on the rear end face of the sleeve 13.

As shown in FIG. 5, the coil connecting part 15*e* is accommodated in the accommodating recessed part 13*b* together with the coil 18 bound to the coil binding part 15*f* and the solder 30. In a comparison case that the coil connecting part 15*e* is formed on the same flat face as the spring piece 15A, the solder 30 is heaped up from the face (reference face "X") on the front side of the second plate spring 15 and thus a design space becomes narrow. However, according to the lens drive device 1 in accordance with this embodiment, even when the solder 30 is heaped up, the coil connecting part 15*e* is bent lower than the reference face "X" (see FIG. 5) to be accommodated in the accommodating recessed part 13*b* and thus a height of the lens drive device 1 can be reduced. Further, when a bending degree of the coil connecting part 15*e* is adjusted, a distance between the coil connecting part 15*e* and its opposite part facing each other can be secured, and thus reliability of a drop strength can be improved for an apparatus, on which the lens drive device 1 is mounted, such as a cell phone with a camera.

Figure 6:
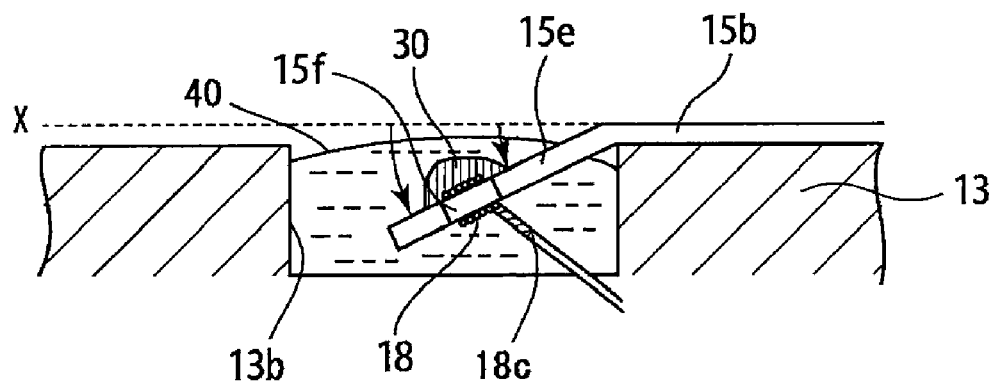
FIG. 6 is a side view showing a state that a coil connecting part is adhesively bonded and fixed with an adhesive.

In order to prevent a problem that a design space is narrowed due to a thickness of the soldered portion, as described above, the coil connecting part 15*e* is accommodated in the accommodating recessed part 13*b* together with the coil 18 which is bound to the coil binding part 15*f* and the solder 30. On the other hand, in order to further prevent a problem that the coil connecting part 15*e* is moved through dropping, vibration or impact and to reduce occurrence of coil disconnection, as shown in FIG. 6, it is preferable that the coil connecting part 15*e* is accommodated in the accommodating recessed part 13*b* and an adhesive 40 is applied in the accommodating recessed part 13*b* to cover the coil connecting part 15*e* so that the coil connecting part 15*e* is adhesively fixed to the accommodating recessed part 13*b*, i.e., the sleeve 13.

In a state that the coil 18 drawn from the sleeve 13 to the coil binding part 15*f* has been soldered to the coil binding part 15*f*, the coil 18 in the vicinity of the coil binding part 15*f* is formed with a boundary part 18*c* which is a boundary of a portion where an insulating layer of the coil has been melted and a portion where the insulating layer is remained. The portion where the insulating layer of the coil has been melted by heat at the time of soldering is changed into a hard state without flexibility but the portion where the insulating layer is remained is provided with flexibility as it is. In the boundary part 18*c* at the portion of different states, the hard portion without flexibility is not easily moved but, on the contrary, the portion having flexibility is freely movable and thus coil disconnection may easily occur due to stress such as dropping, vibration and impact. Therefore, the adhesive 40 is preferably applied to or filled in the accommodating recessed part 13*b* so as to cover the coil 18 in the vicinity of the coil binding part 15*f* together with the coil binding part 15*f*. Specifically, the adhesive 40 is preferably applied to or filled in the accommodating recessed part 13*b* so as to cover at least the boundary part 18*c* in the above-mentioned different states and to be adhesively fixed to the sleeve 13. According to this structure, possibility of coil disconnection due to dropping, vibration and impact can be further reduced. When the adhesive 40 is filled up in the entire accommodating recessed part 13*b* as shown in FIG. 6, the boundary part 18*c* can be covered together with the coil binding part 15*f* as it is. However, the adhesive 40 is not always required to fill so as to cover the entire accommodating recessed part 13*b*. Further, there is a case where the accommodating recessed part 13*b* is not formed as a complete recessed part. Therefore, it is preferable that, as described above, the adhesive 40 is filled so as to cover the boundary part 18*c* in addition to the coil binding part 15*f* and to be adhesively fixed to the sleeve 13.

When a high viscosity epoxy system UV adhesive is used as the adhesive 40, the adhesive is prevented from dripping after having been coated and can be hardened by ultraviolet irradiation at a short time and thus workability is satisfactory and handling after work can be easily performed.

In the lens drive device 1 in accordance with the embodiment described above, the movable body is located on an image sensor element side (image side) at a not-energized time of the first coil 181 and the second coil 182. In this case, the wire spring 16 restricts displacement of the movable body by a magnetic attractive force acting between the magnets 17 and the wire spring 16. A some distance between the wire spring 16 and the magnets 17 is maintained and thus the magnetic attractive force between the wire spring 16 and the magnets 17 are prevented from becoming too strong. Therefore, the center axis of the movable body is prevented from being shifted and, as a result, deterioration of a tilt characteristic can be prevented.

In the above-mentioned state, when an electric current is supplied to the first coil 181 and the second coil 182, an electromagnetic force in an upward direction (front side) is applied to the first coil 181 and the second coil 182 respectively. Therefore, the first coil 181, the second coil 182 and the sleeve 13 begin to move on an object to be photographed side (front side).

In this case, elastic forces which restrict movement of the sleeve 13 are respectively generated between the first plate spring 14 and the front end of the sleeve 13, and between the second plate spring 15 and the rear end of the sleeve 13. Therefore, when the electromagnetic force for moving the sleeve 13 to the front side and the elastic forces for restricting movement of the sleeve 13 are balanced, the movement of the sleeve 13 is stopped. Further, when an electric current in an opposite direction is supplied to the first coil 181 and the second coil 182, an electromagnetic force in a downward direction (rear side) is applied to the first coil 181 and the second coil 182 respectively.

In accordance with this embodiment, the sleeve 13 (movable body) can be stopped at a desired position by adjusting a current amount supplied to the first coil 181 and the second coil 182 and the elastic forces acting on the sleeve 13 by the first plate spring 14 and the second plate spring 15. When the sleeve 13 is stopped by using balance between the electromagnetic force and the elastic force, occurrence of a collision noise can be prevented, which is different from a case that two members are brought into abutting with each other such as engaging with an engaging part.

According to the lens drive device 1 in accordance with the embodiment described above, as described with reference to FIGS. 3 through 6, the solder heaped on the coil 18 is accommodated in the accommodating part 13*b* by an amount that the coil connecting part 15*e* has been bent to the accommodating part 13*b*. Therefore, a distance between parts facing each other is not required to increase and thus height and size of the lens drive device 1 can be reduced.

Further, when a distance between the parts facing each other is sufficiently secured by bending the coil connecting part 15*e*, disconnection of the coil due to abutting can be prevented and reliability of a drop strength is enhanced. In addition, the coil connecting parts 15*e* and 15*e*' are provided in the vicinity of the positioning holes 15*g* of the spring piece 15A and 15B. Therefore, even when the coil connecting parts 15*e* and 15*e*' are bent in a large extent, the spring pieces 15A and 15B is hardly floated.

In the embodiment described above, a direction that the coil connecting part 15*e* is bent is set to an inner side of the accommodating part 13*b* (rear side) but the coil connecting part 15*e* may be bent in another direction. For example, the coil connecting part 15*e* may be bent to an outer side or to an inner side in a radial direction. Further, it may be structured that the coil connecting part 15*e* has been bent in advance and then soldered instead of bending after having been soldered. Any method may be utilized instead of soldering when conduction is attained.

Next, embodiments in accordance with another embodiment of the invention, in other words, a lens drive device, which is provided with a spring member where accuracy of a spring constant of a plate spring-shaped arm part is improved, and the spring member, and manufacturing methods for the lens drive device and the spring member will be described below with reference to the accompanying drawings. A lens drive device which will be described below may be mounted on various electronic apparatuses in addition to a cell phone with a camera. For example, the lens drive device may be mounted on a thin-type digital camera, a PHS, a PDA, a bar code reader, a monitoring camera, a camera for rear confirmation in a car, a door having optical authentication function or the like.

FIG. 7(*a*) is an outward appearance view showing a lens drive device in accordance with an embodiment of another embodiment of the invention which is viewed from obliquely above, and FIG. 7(*b*) is its exploded perspective view.

In FIGS. 7(*a*) and 7(*b*), a lens drive device 1 in accordance with an embodiment of the present invention is a lens drive device in a thin-type camera used in a cell phone with a camera, in which, for example, three lenses 121 are moved along an optical axis direction in both directions, i.e., in an "A"-direction (front side) approaching an object to be photographed (object side) and in a "B"-direction (rear side) approaching an opposite side (image side) to the object to be photographed. The lens drive device 1 is provided with a roughly rectangular parallelepiped shape. The lens drive device 1 generally includes a movable body 3 which holds a cylindrical lens holder 120 provided with three lenses 121 and a fixed diaphragm on its inner side, a lens drive mechanism 5 for moving the movable body 3 along the optical axis direction, and a support body 2 on which the lens drive mechanism 5 and the movable body 3 are mounted. The movable body 3 is provided with a cylindrical sleeve 130 and a cylindrical lens holder 120 is fixed to its inner side. Therefore, an outer shape of the movable body 3 is defined by the sleeve 130 to be formed in a roughly cylindrical shape.

The support body 2 includes a rectangular holder 190 for holding an image sensor element (not shown) on the image side, a box-shaped yoke 180 and a spacer 110 which are located on the object to be photographed side. The yoke 180 and the spacer 110 are respectively formed with circular incident apertures 180a and 110a for taking a light beam from an object to be photographed into the lenses 121. The yoke 180 is made of a ferromagnetic plate such as a steel plate and, as described below, the yoke 180 structures an interlinkage magnetic field generation body 4 together with magnets 170 for generating interlinkage magnetic fields in a drive coil 300 which is held by the sleeve 130. In this embodiment, a side plate part 181 of the yoke 180 is fitted to an upper face of the holder 190.

The lens drive mechanism 5 includes the drive coil 300 which is wound around an outer peripheral face of the sleeve 130 and the interlinkage magnetic field generation body 4 generating an interlinkage magnetic field to the drive coil 300. The magnetic drive mechanism 5a is structured of the drive coils 300 and the interlinkage magnetic field generation body 4. The interlinkage magnetic field generation body 4 is provided with four magnets 170 which face the drive coil 300 on its outer peripheral side. Further, the yoke 180 is also used as a structural element of the lens drive mechanism.

The yoke 180 is formed in a box-like shape so as to cover a side face and an upper face of the drive coil 300 and thus leakage flux from a magnetic path which is structured between the magnets 170 and the drive coil 300 can be reduced and linearity between a moving amount of the sleeve 130 and an electric current supplied to the drive coil 300 can be improved. A pair of side face parts 181 of the yoke 180 facing each other is formed in a flat face shape and a pair of side face parts 182 facing each other is formed with a protruded part 182b protruding on an outer side in a step-like shape at its center portion by recessing both end portions 182a on an inner side.

In this embodiment, each of four magnets 170 is provided with a roughly triangular pole shape, and four magnets 170 are fixed on an inner peripheral face of the yoke 180 at four corner parts in a separate state in a circumferential direction. Each of the four magnets 170 is divided into two pieces in the optical axis direction and all of the magnets are magnetized so that their outer side faces are magnetized in different poles from their inner side faces. Further, in the four magnets 170, for example, the inner side face of the upper half portion is magnetized in an "N"-pole and its outer side face is magnetized in an "S"-pole, and the inner side face of the Iowa half portion is magnetized in an "S"-pole and its outer side face is magnetized in an "N"-pole. Therefore, the drive coil 300 is divided into two portions so as to correspond to the upper half and the lower half of the magnets 170, and winding directions of the drive coils divided into two portions are opposite to each other. As described above, when the magnets 170 are disposed to be divided at four corners, in a case that a gap space between the yoke 180 and the sleeve 130 at a center portion of a side part of the yoke 180 is set to be narrow, the magnet 170 is prevented from being formed with a thin portion and thus strength of the magnet 170 can be enhanced and a magnetic force of the magnet 170 can be efficiently acted on the drive coils 300 which are mounted on the movable body 3. Further, the size of the entire lens drive device 1 can be reduced by means of that spaces of the four corners between the movable body 3 and the yoke 180 are effectively utilized as arranging spaces for the magnets 170.

The lens drive mechanism 5 further includes spring members 140x and 140y which are disposed between the holder 190 and the sleeve 130 and between the spacer 110 and the sleeve 130. Each of two spring members 140x and 140y is made of metal such as beryllium copper, SUS system steel material and the like and is formed by press working to a thin plate having a predetermined thickness or by etching processing in which a photo lithography technique is utilized.

The spring member 140x is connected to the holder 190 and the sleeve 130 so that the movable body 3 is movably supported along the lens optical axis by the support body 2. Further, the spring member 140y is connected to the spacer 110 and the sleeve 130 so that the movable body 3 is movably supported along the lens optical axis by the support body 2.

Further, the spring member 140x which is disposed on the holder 190 side is separated into two spring pieces 140a and 140b, and two ends of the drive coil 300, i.e., a winding start part and a winding end part are respectively connected to the spring pieces 140a and 140b. In this case, the coil end on the object to be photographed side of the drive coil 300 is passed under the drive coil 300 through a groove (not shown) which is formed on the outer peripheral face of the sleeve 130 to be drawn to the spring piece 140a. Further, the spring pieces 140a and 140b of the spring member 140x are respectively formed with a terminal 120c and thus the spring member 140x (spring pieces 140a and 140b) functions as a power supply member to the drive coil 300.

In this embodiment, the lens drive mechanism 5 is further provided with a ring-shaped magnetic piece 131 which is held on the upper end of the sleeve 130. The magnetic piece 131 applies an urging force in the optical axis direction to the movable body 3 by an attractive force acted between the magnets 170 and the magnetic piece 131. Therefore, the movable body 3 is prevented from being displaced by its own weight at the time of no energization and thus the movable body 3 can be maintained in a desired posture and, in addition, its impact resistance can be improved. Further, the magnetic piece 131 also functions as a back yoke and thus leakage flux from a magnetic path which is structured between the magnets 170 and the drive coil 300 can be reduced. In accordance with an embodiment of the present invention, a bar-type magnetic member may be used for the magnetic piece 131.

The spacer 110 is mounted on an inside face of a top plate part 185 of the yoke 180 and is provided with a plate part 115 that is formed with an incident aperture 110a at its center portion. A small projection 112 which is projected on the image sensor element side is formed at four corners of the plate part 115.

Further, a small projection 192 extending on the object to be photographed side is formed at four corners of the holder 190. The small projections 192 of the holder 190 and the small projections 112 of the spacer 110 are used when the two spring members 140x and 140y are connected to the support body 2.

Projections 130a and 130b protruding on the outer peripheral side are formed on the outer peripheral face of the sleeve 13. The projections 130a and 130b are protruded in a direction perpendicular to the optical axis "X" on both sides interposing the lens 121 (lens holder 120). When the sleeve 130 (movable body 3) structured as described above is disposed within the support body 2, the projections 130a and 130b are disposed on inner sides of the protruded parts 182b of the yoke 180 between the adjacent magnets 170. In this embodiment, the protruded part 182b is extended in the optical axis direction and thus the protruded part 182b functions as a moving passage 182e for permitting movement of the projections 130a and 130b in the optical axis direction when the movable body 3 is moved in the optical axis direction. Further, when the movable body 3 is displaced due to an impact or the like in the direction perpendicular to the optical axis direction (right and left direction or circumferential direction), the projections 130a and 130b are abutted with the inner wall face of the protruded part 182b of the yoke 180. Therefore, displacement in the right and left direction or rotary displacement in the circumferential direction which is perpendicular to the optical axis direction of the movable body 3 can be prevented.

A plurality of small projections 130y is formed in the circumferential direction on the upper end face of the sleeve 130 (end face on the object to be photographed side) for connecting with the spring member 140y, and a plurality of small projections 130x is formed in the circumferential direction on the lower end face of the sleeve 130 (end face on the image sensor element side) for connecting with the spring member 140x.

Figures 7A, 7B:
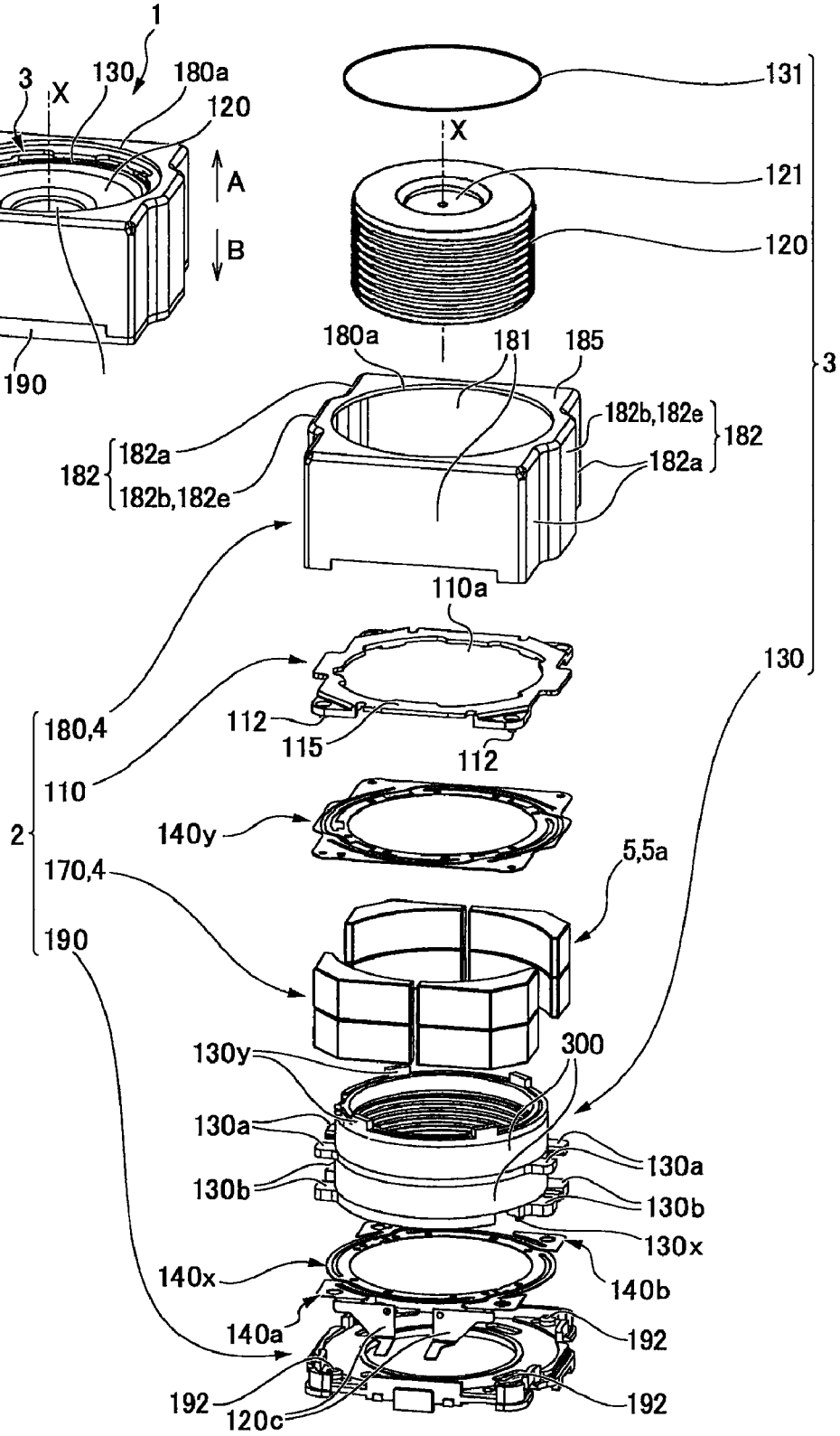
FIG. 7(a) is an outward appearance view showing a lens drive device in accordance with an embodiment of another embodiment of the present invention which is viewed from obliquely above.
FIG. 7(b) is its exploded perspective view.
Figure 8:
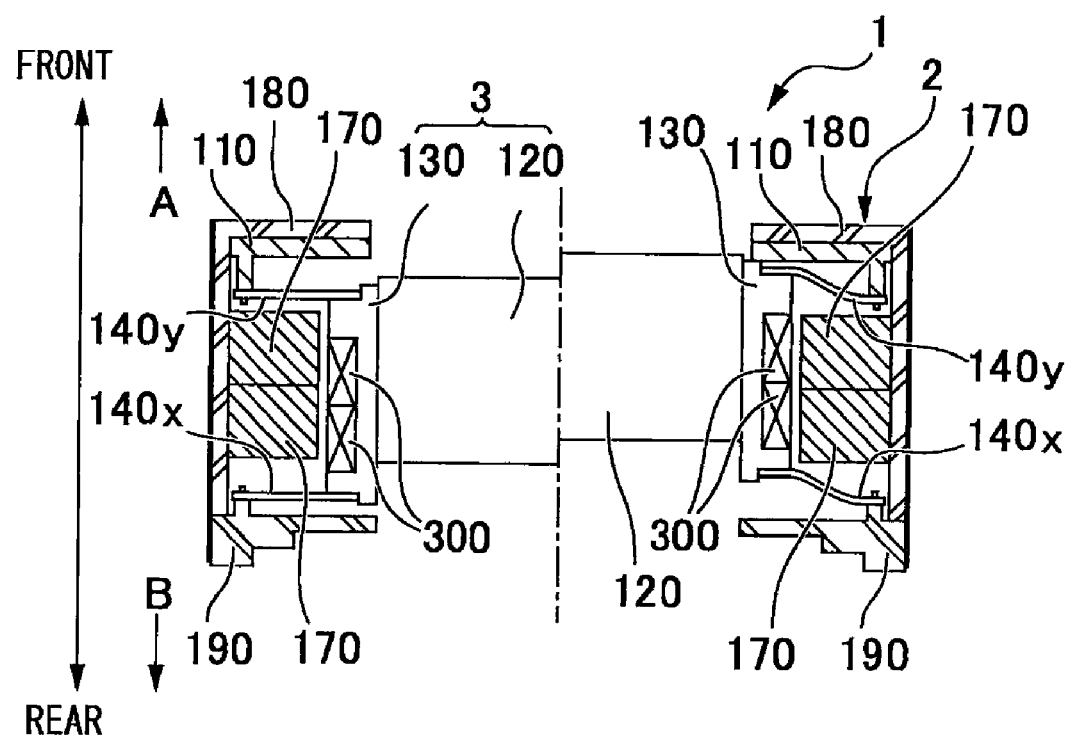
FIG. 8 is an explanatory cross-sectional side view schematically showing an operation of the lens drive device shown in FIGS. 7(a) and 7(b).

FIG. 8 is an explanatory cross-sectional side view schematically showing an operation of the lens drive device 1 shown in FIGS. 7(a) and 7(b). A left half in FIG. 8 is a view showing a state where the sleeve 130 is located at an infinite position (normal photographing position) and a right half in FIG. 8 is a view showing a state where the sleeve 13 is located at a macro position (close-up photographing position).

In the lens drive device 1 in this embodiment, the movable body 3 is normally located on the image sensor element side (image side) and, in this state, when an electric current is supplied to the drive coil 300 in a predetermined direction, the drive coil 300 receives an electromagnetic force for upward movement (front side). As a result, the sleeve 130 to which the drive coil 300 is fixed begins to move to an object to be photographed side (front side). In this case, elastic forces for restricting movement of the sleeve 130 respectively occur between the spring member 140y and the front end of the sleeve 130 and between the spring member 140x and the rear end of the sleeve 130. Therefore, when the electromagnetic force for moving the sleeve 130 toward me front side and the elastic forces for restricting the movement of the sleeve 130 are balanced with each other, the sleeve 130 is stopped. In this case, the sleeve 130 (movable body 3) can be stopped at a desired position by adjusting an amount of a current supplied to the drive coil 300 depending on the elastic forces of the spring members 140x and 140y acting on the sleeve 130. In this embodiment, since the spring members 140x and 140y having a linear relationship between the elastic forces (stress) and the moving amount (bending amount) ate used, a linearity between the moving amount of the sleeve 130 and the electric current supplied to the drive coil 300 can be improved. Further, since the two spring members 140x and 140y are used large balanced forces are applied to the sleeve 130 in the direction of the optical axis "X" when the sleeve 130 is stopped and thus, even when another force such as a centrifugal force or an impact force is acted on the sleeve 130 in the direction of the optical axis "X", the sleeve 130 can be further stably stopped. In addition, in the lens drive device 1, the sleeve 130 is stopped by utilizing the balance of the electromagnetic force with the elastic force instead of abutting with an abutting member (buffer member) and thus occurrence of a collision noise is prevented.

Figure 9A:
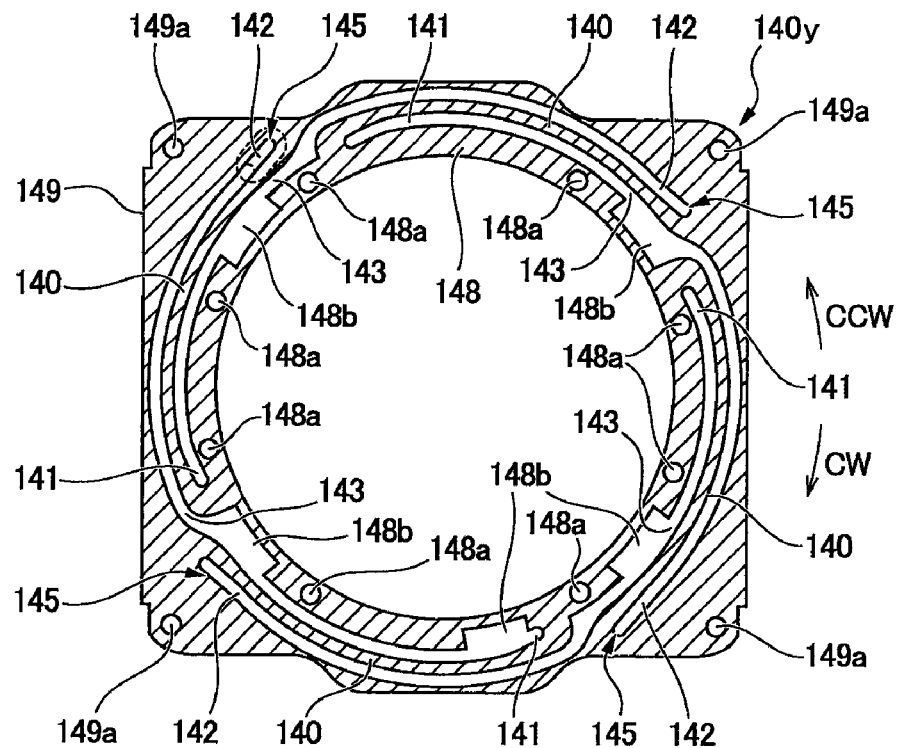
FIG. 9(a) is a plan view showing one of spring members which is used in a lens drive device in accordance with an embodiment of the present invention.
Figure 9B:
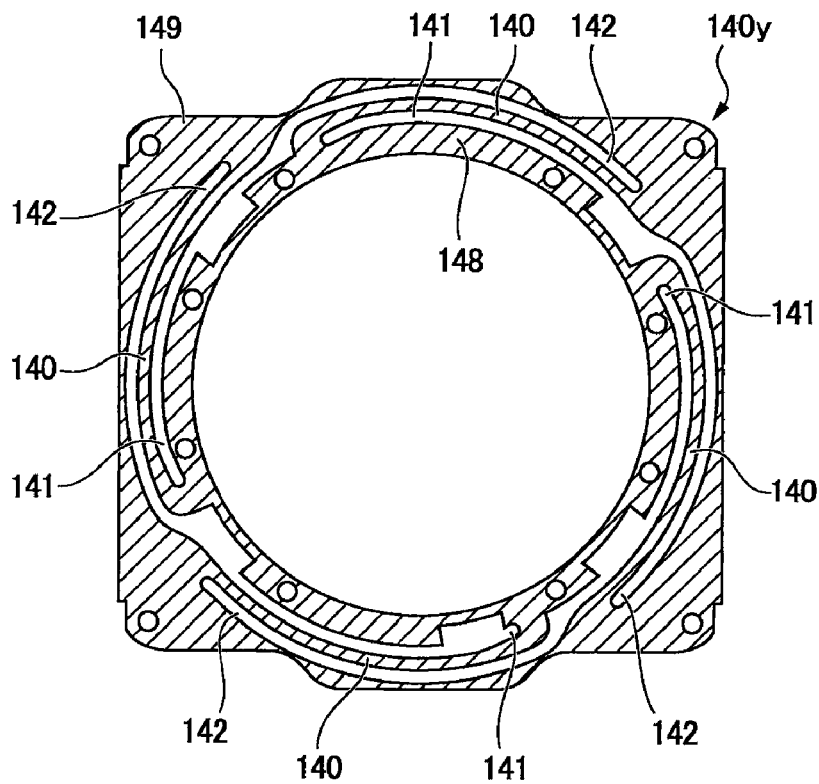
FIG. 9(b) is a plan view showing the spring member before a laser trimming is performed on the spring member.

The structure of the spring member 140y will be described below with reference to FIGS. 7(a) and 7(b) and FIGS. 9(a) and 9(b). FIG. 9(a) is a plan view showing the spring member 140y which is used in a lens drive device in accordance with an embodiment of the present invention, and FIG. 9(b) is a plan view showing the spring member 140y before a laser trimming is performed on the spring member.

As shown in FIG. 7(b) and FIG. 9(a), the spring member 140y includes a rectangular frame-shaped support body side fixing part 149 which is fixed to the support body 2 (spacer 110), a circular ring shaped movable body side fixing part 148 which is fixed to the movable body 3 (sleeve 130), and four plate spring-shaped arm parts 140 which connect the movable body side fixing part 148 with the support body side fixing part 149. The support body side fixing part 149 is formed at its four corner parts with small holes 149a into which the small projections 112 of the spacer 110 are respectively fitted. After the small projections 112 have been fitted into the small holes 149a to perform positioning of the support body side fixing part 149 to the spacer 110, the support body side fixing part 149 and the spacer 110 are fixed to each other by, for example, an adhesive which is coated in the small holes 149a to be rigidified. Further, portions of the movable body side fixing part 148 corresponding to four corner parts of the support body side fixing part 149 are formed with rectangular recessed parts 148b which are recessed on an inner side in a radial direction and are formed with small holes 148a so as to interpose the rectangular recessed part 148b, i.e., at both sides of the rectangular recessed part 148b in a circumferential direction Therefore, after the small projections 130y have been fitted into the rectangular recessed parts 148b to perform positioning of the movable body side fixing part 148 and the sleeve 130, the movable body side fixing part 148 and the sleeve 130 are fixed to each other by, for example, an adhesive which is coated in the small holes 148a to be rigidified.

The spring member 140y is formed by press working to a thin metal plate or by etching processing utilizing a photo lithography technique. In this case, four cut-out parts 143 extending in the circumferential direction are formed between the movable body side fixing part 148 and the support body side fixing part 149, and the four arm parts 140 extending in the circumferential direction are formed through the cut-out parts 143.

In other words, although the four cut-out parts 143 are respectively extended in the circumferential direction, in the embodiment shown in FIG. 9(a), each of the cut-out parts 143 is extended so as to shift from an inner peripheral side to an outer peripheral side at a midway position in a clockwise direction CW. Therefore, the two cut-out parts 143 which are adjacently disposed in the circumferential direction are arranged so that their portions corresponding to about half in the longitudinal direction are overlapped with each other in the radial direction. Therefore, a narrow-width arm part 140 is formed by the overlapped portions of the adjacent cut-out parts 143 in the circumferential direction so mat its inner circumferential edge portion is defined by the portion of the cut-out part 143 which is located on the counterclockwise direction CCW side. The outer peripheral edge portion of the arm part 140 is defined by the portion of the cut-out part 143 which is located on the clockwise direction CW side.

In the spring member 140y structured as described above, all of the four cut-out parts 143 are extended in a slit-like shape. Therefore, a first slit part 141 is cut out on an inner side of the arm part 140 in the spring member 140y toward a connecting portion of the arm part 140 with the movable body side fixing part 148, and a second slit part 142 is cut out on an outer side of the arm part 140 toward a connecting portion of the arm part 140 with the support body side fixing part 149. A length dimension of the arm part 140 is determined by the cutting length of the first slit part 141 and the second slit part 142. In other words, the first slit part 141 which is located on the inner side of the arm part 140 and the second slit part 142 which is located on the outer side of the arm part 140 and which is formed at the position adjacent in the circumferential direction structure the cut-out part 143 which is connected in the circumferential direction to form all of the four arm parts 140. The length dimension of the arm part 140 is determined by a length of the cut-out part 143. In this embodiment, the length dimension of the arm part 140 may be set from 3 mm to 5 mm.

Figure 10A:
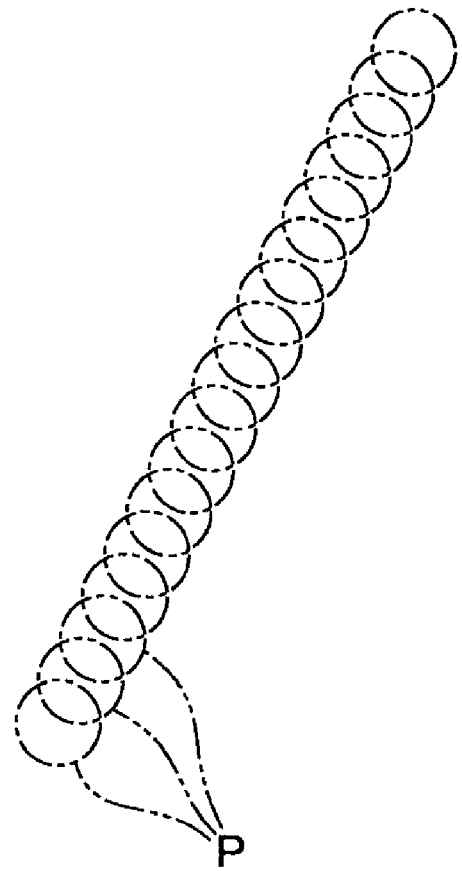
FIG. 10(a) is an explanatory view showing laser trimming when a spring member is manufactured in accordance with an embodiment of the present invention.
Figure 10B:
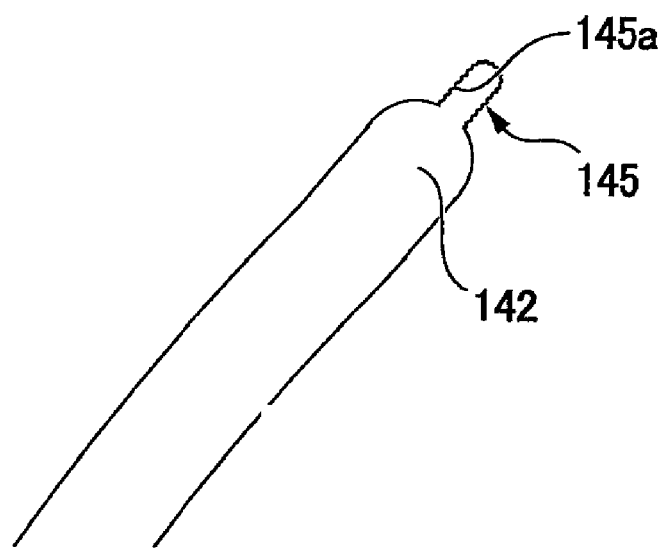
FIG. 10(b) is an explanatory view showing a cut portion formed with a laser.
Figure 11A:
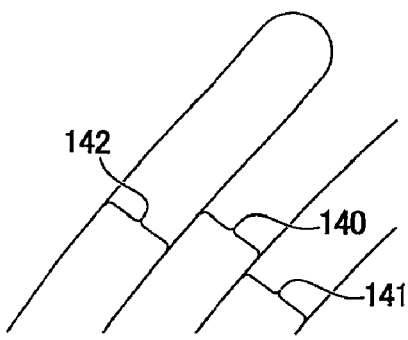
FIGS. 11(a) through 11(g) are explanatory views showing cut portions formed with a laser in a spring member in accordance with an embodiment of the present invention.
Figure 11B:
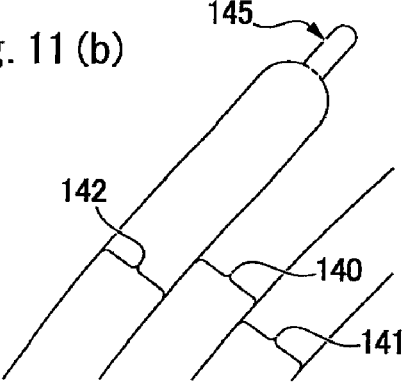
Figure 11C:
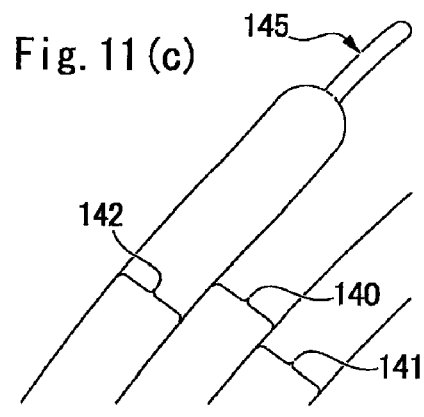
Figure 11D:
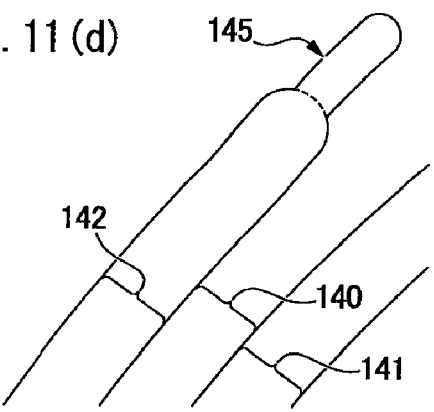
Figure 11E:
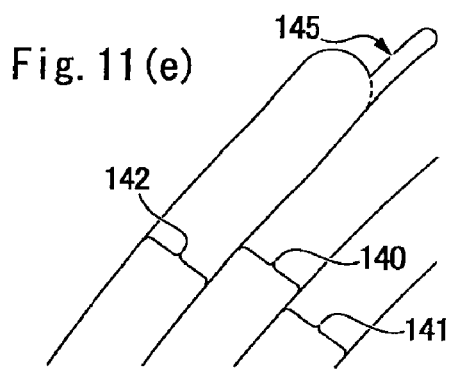
Figure 11F:
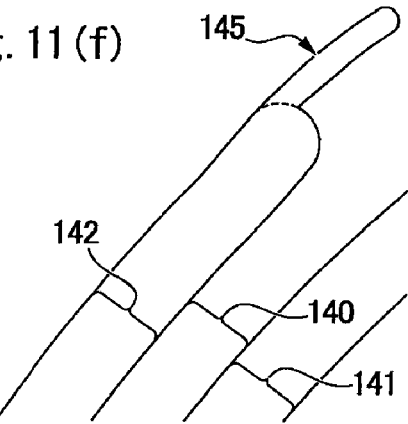
Figure 11G:
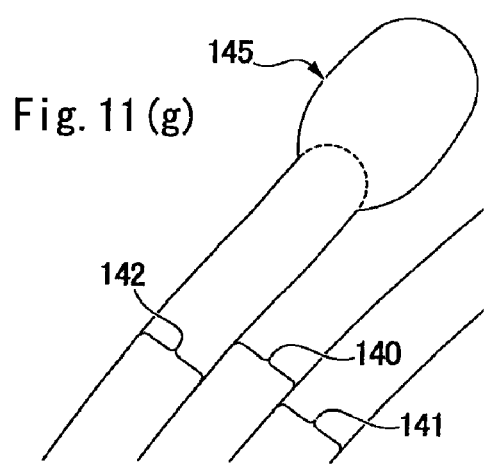

FIG. 10(a) is an explanatory view showing laser trimming when the spring member 140y is manufactured and FIG. 10(b) is an explanatory view showing a cutting portion formed by a laser.

In the lens drive device 1 in this embodiment, as described with reference to FIG. 8, the spring member 140y restricts the position of the movable body 3 by an urging force. Therefore, the arm part 140 requires a spring constant with a high degree of accuracy. In this embodiment, the spring member 140y is manufactured by the following manufacturing method.

First, in a "cutting" process, as shown in FIG. 9(b), press working or etching processing utilizing a photo lithography technique is performed on a metal thin plate such as beryllium copper or SUS system steel material and the cut-out parts 143 and the like are formed in the thin plate to form the support body side fixing part 149, the movable body side fixing part 148 and the arm parts 140.

Next, in a "laser trimming" process, a spring constant of the arm part 140 which has been formed in the "cutting" process is measured and, on the basis of a measurement result of the spring constant, a shape and a dimension of the arm part 140 are changed by using a laser to correct the spring constant. Specifically, with respect to all of the four cut-out parts 143 of the spring member 140y shown in FIG. 9(b), a laser spot is irradiated at an end part of the second slit part 142 to perform partial cutting on a connecting portion of the arm part 140 with the support body side fixing part 149 so as to extend the second slit part 142.

More specifically, as shown in FIG. 10(a), a laser beam (for example, YAG laser/wavelength 1064 nm) is irradiated on the connecting portion of the arm part 140 with the support body side fixing part 149 while the position of the laser spot "P" is shifted. The conditions in this case are, for example, as follows;

Scan speed is 50 mm/s,
Q-switch frequency (on-off frequency of a laser) is 100 kHz, and
Repetition number is 50 times.

As a result, for example, as shown in FIG. 10(b), a cut portion 145 is formed by the laser so as to extend the second slit part 142. Therefore, most of the edge part of the arm part 140 is a straight or curved cut portion which is formed by press working or etching processing utilizing a photo lithography technique to a metal thin plate, and the cut portion 145 is formed in the connecting portion of the aim part 140 with the support body side fixing part 149 by using the laser in the laser trimming process. Therefore, the cut portion 145 is formed with a minute recessed and convex part 145a. In other words, when cutting by a laser is performed, a groove referred to as "kerf" is formed and the groove is continuously formed as the cut portion 145 and a trace of laser trimming is left. Shapes of cut edges are different from each other between the portion which is cut by press working or etching processing with the use of a photo lithography technique and the cut portion 145 formed by the laser. Alternatively, even when most of the recessed and convex part 145a is not left, heat is generated at the time of cutting by the laser and the cut edge of the groove may change its color by heat. Therefore, colors are different from each other between the portion which is cut by press working or etching processing with the use of a photo lithography technique and the laser cut portion 145 by the laser and thus they can be distinguished from each other.

In accordance with an embodiment of the present invention, a laser maybe irradiated either from one face side or from both face sides of the spring member 140y. However, in order to prevent a situation that the arm part 140 is warped on one face side due to heat generated when the laser is irradiated, it is preferable that the laser is irradiated on the spring member 140y from its both face sides.

In this embodiment, trimming is performed on all of the four arm parts 140 with a laser. Therefore, as shown in FIG. 9(a), in all of the four arm parts 140, the cut portion 145 is formed by the laser in the connecting portion of the arm part 140 with the support body side fixing part 149, and a length dimension of the arm part 140 is extended by a dimension cut by the laser. In order to perform cutting by the laser, a cutting dimension is determined on the basis of a measured result of the spring constant of the arm part 140. In other words, a spring constant, a modulus of longitudinal elasticity, a plate width, a plate thickness and a length dimension of the aim part 140 are respectively set to be "k", "E", "b", "t" and "a", the following relationship is satisfied $$k = E \cdot b \cdot t^3 / 4 \cdot a^3$$

Therefore, when the length dimension "a" of the arm part 140 is corrected, the spring constant "k" is corrected.

The laser trimming process may be performed such that a spring constant of the arm part 140 is measured for one piece of the spring member 140x and then trimming by using a laser is performed Alternatively, a spring constant of the arm part 140 may be measured for all of a plurality of the spring members 140x and then trimmings by using a laser are respectively performed for the plurality of the spring members 140x. In either case, a method may be adopted in which the arm part 140 is designed so that a spring constant becomes larger than a final target value and then trimmings by using a laser are respectively performed for all the spring members 140x. Alternatively, the arm part 140 may be designed so that a spring constant becomes a final target value and then trimming by using a laser is performed only for the spring member 140x whose spring constant has shifted from the final target value.

Figure 12:
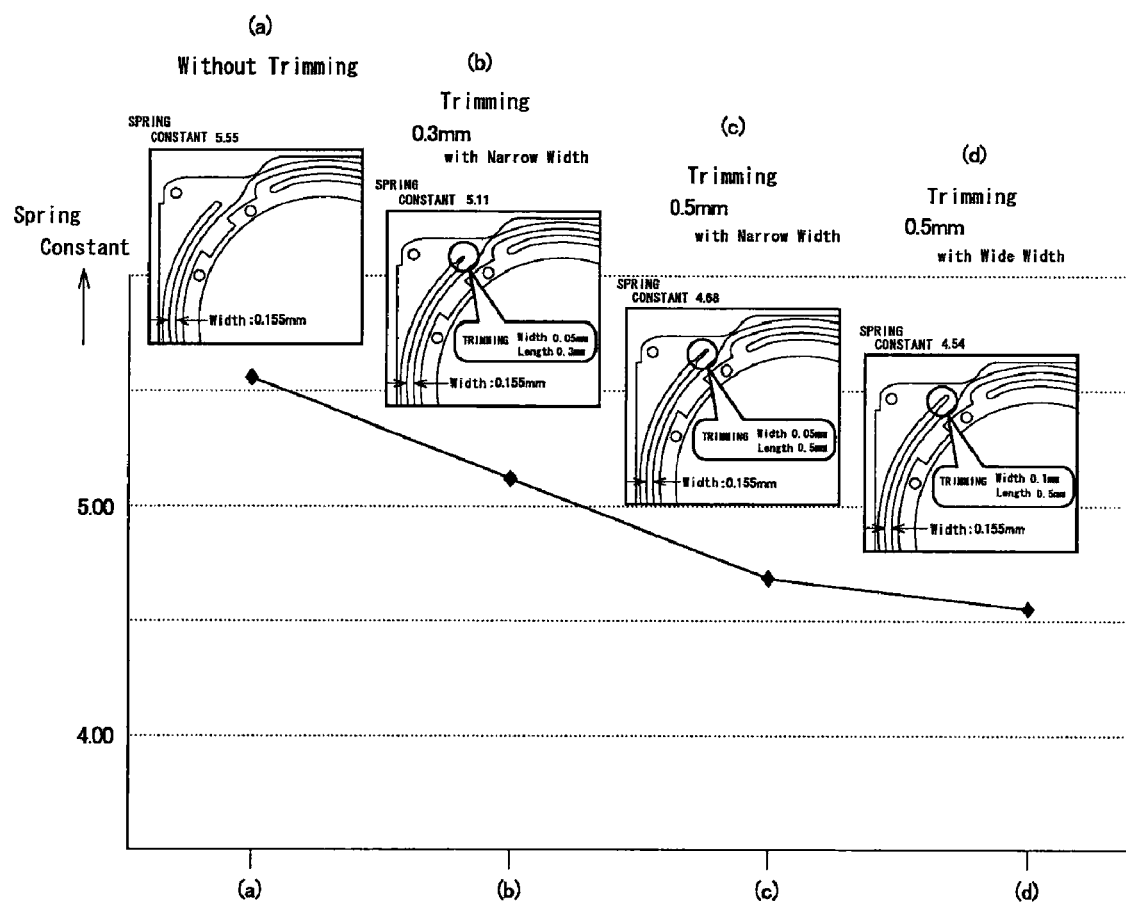
FIG. 12 is an explanatory graph showing change of a spring constant before and after laser trimming is performed in a spring member in accordance with an embodiment of the present invention.

FIGS. 11(a) through 11(g) are explanatory views showing cut portions formed with a laser in a spring member to which at least an embodiment of the present invention is applied. FIG. 12 is an explanatory graph showing change of a spring constant before and after laser trimming is performed in a spring member to which at least an embodiment of the present invention is applied.

In the spring member 140y to which at least an embodiment of the present invention is applied, a spring constant of the arm part 140 is corrected to an optimum value by means of that the cut portion 145 is formed by using a laser in the laser trimming process. Therefore, the spring member 140y having a spring constant with a high degree of accuracy can be manufactured and, in the lens drive device 1 in which the above-mentioned spring member 140y is used, the position of the movable body 3 can be controlled with a high degree of accuracy.

In this embodiment, a length dimension of the arm part 140 is extended by the laser trimming process. Therefore, different from a case of changing the shape of the arm part 140, even when a width dimension of the arm part 140 is narrow, trimming can be easily performed.

Further, in this embodiment, in order to extend a length dimension of the arm part 140 in the laser trimming process, not the first slit part 141 but the second slit part 142 is extended to make the length dimension of the arm part 140 longer. Therefore, occurrence of the following situation due to laser trimming is restricted. In other words, the shape and the width dimension of the connecting part of the arm part 140 with the movable body side fixing part 148 are often set in consideration of its strength and the like. Therefore, in a case that the first slit part 141 is extended by using a laser, a strength of the connecting part of the arm part 140 with the movable body side fixing part 148 may be deteriorated but, when the second slit part 142 is extended by a laser, the above-mentioned deterioration is prevented.

In accordance with an embodiment of the present invention, a shape of the cut portion 145 by using a laser may be arbitrarily set according to irradiation conditions of the laser to the end part of the second slit part 142 shown in FIG. 11(*a*). For example, as shown in FIG. 11(*b*), the cut portion 145 having a width dimension (for example, 0.05 mm) narrower than the width dimension of the second slit part 142 (for example, 0.155 mm) may be formed from a substantially center portion in the widthwise direction of the second slit part 142 in a short length dimension (for example, 0.3 mm). Further, as shown in FIG. 11(*c*), the cut portion 145 having the width dimension, for example, of 0.03 mm may be formed from a substantially center portion in the widthwise direction of the second slit part 142 in the length dimension of 0.6 mm. In addition, as shown in FIG. 11(*d*), the cut portion 145 having the width dimension, for example, of 0.1 mm may be formed from a substantially center portion in the widthwise direction of the second slit part 142 in the length dimension of 0.5 mm.

According to the embodiments described above, as shown in FIG. 12, although the spring constant of the spring member 140*y* without laser beam machining shown in FIG. 11(*a*) is 5.55, the spring constant of the spring member 140*y* shown in FIG. 11(*b*) is corrected to 5.11, the spring constant of the spring member 140*y* shown in FIG. 11(*c*) is corrected to 4.68, and the spring constant of the spring member 140*y* shown in FIG. 11(*d*) is corrected to 4.54.

In addition to the shapes shown in FIGS. 11(*b*) through 11(*d*), the cut portion 145 may be formed with a laser in a shape in which, for example, as shown in FIG. 11(*e*), the cut portion 145 is extended from the arm part 140 side of the end part of the second slit part 142. Alternatively, as shown in FIG. 11(*f*), the cut portion 145 may be formed in a shape so as to extend from the opposite side to the arm part 140 or, as shown in FIG. 11(*g*), the cut portion 145 maybe formed wider than the second slit part 142.

Figure 13A:
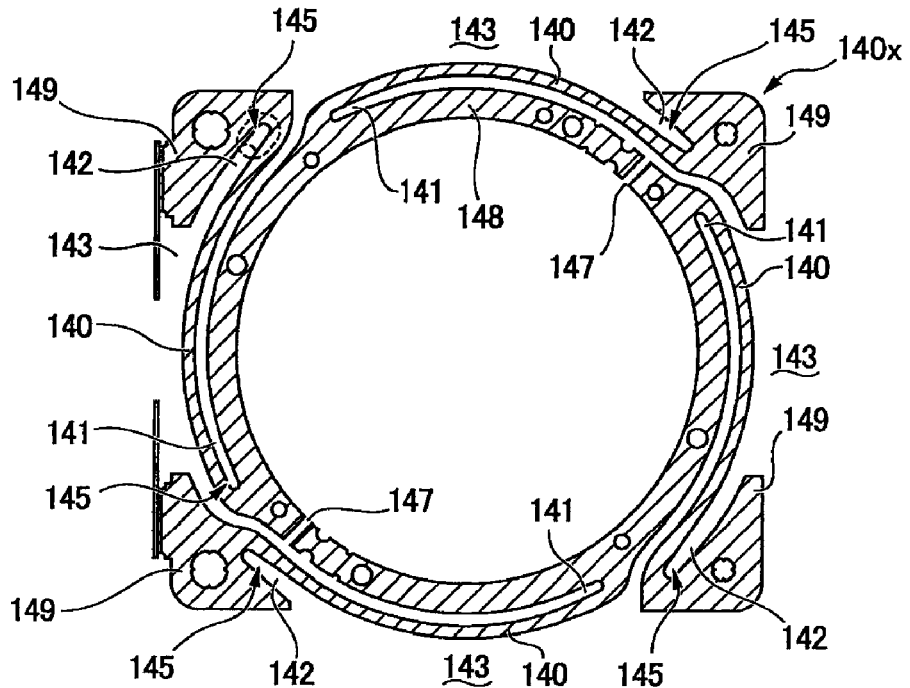
FIG. 13(a) is a plan view showing the other of the spring members which is used in the lens drive device in accordance with an embodiment of the present invention.
Figure 13B:
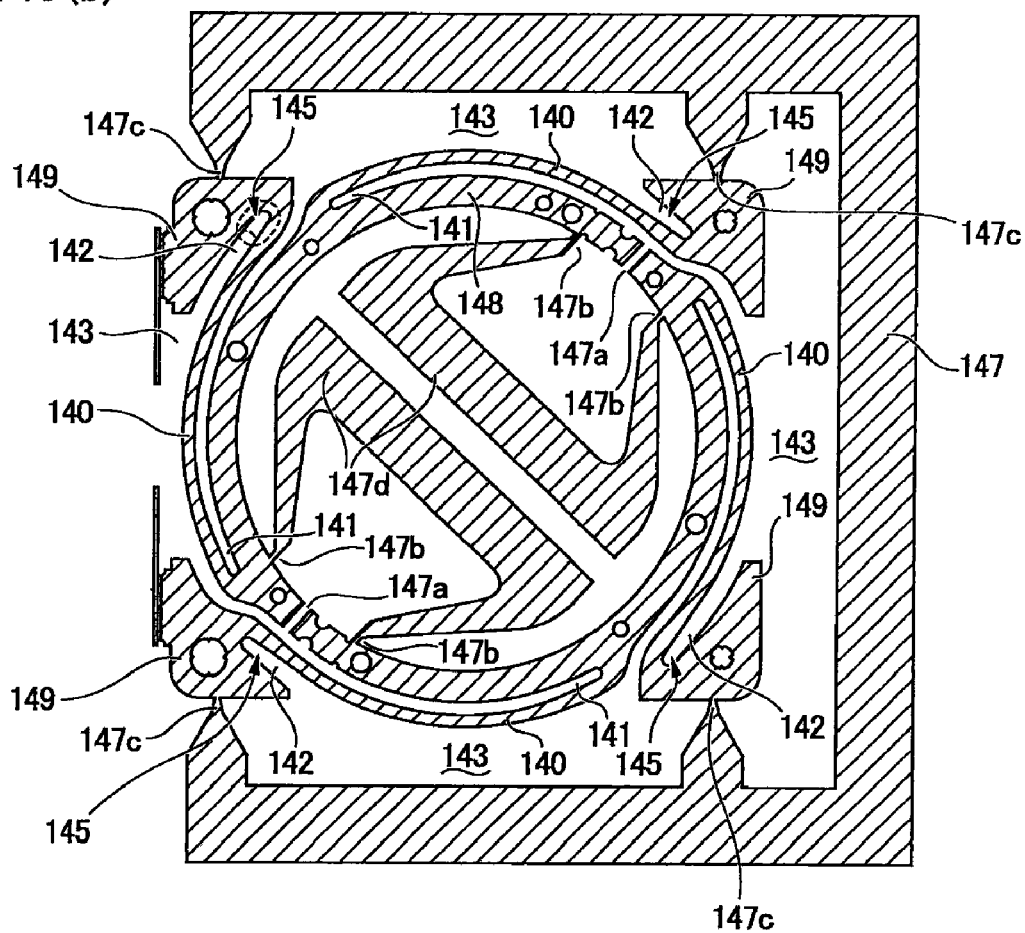
FIG. 13(b) is a plan view showing a state before the spring member is cut off from a frame.

The structure of the spring member 140*x* will be described below with reference to FIG. 7(*b*) and FIG. 13(*a*). FIG. 13(*a*) is a plan view showing the spring member 140*x* which is used in the lens drive device 1 to which at least an embodiment of the present invention is applied, and FIG. 13(*b*) is a plan view showing a stare before the spring member 140*x* is cut off from a frame. In accordance with this embodiment, the basic structure of the spring member 140*x* is the same as the spring member 140*y* and thus the same notational symbols are used in the common portions and their detailed descriptions are omitted.

As shown in FIG. 7(*b*) and FIG. 13(*a*), the spring member 140*x* includes a support body side fixing part 149 fixed to the support body 2 (holder 190), a circular ring shaped movable body side fixing part 148 fixed to the movable body 3 (sleeve 130), and four plate spring-shaped arm parts 140 which connect the support body side fixing part 149 and the movable body side fixing part 148. Different from the spring member 140*y*, the spring member 140*x* is used as a power supply member to the drive coil 30 and thus it is divided into two spring pieces 140*a* and 140*b*. In other words, the support body side fixing part 149 of the spring member 140*x* is divided into four portions and the movable body side fixing part 148 is divided into two portions by slits 147*a*. In this embodiment, as shown in FIG. 13(*b*), in a state before the spring member 140*x* is assembled into the lens drive device 1, two spring pieces 140*a* and 140*b* are connected through a frame 147 and connecting plate parts 147*d*. After the spring member 140*x* has been assembled into the lens drive device 1, the frame 147 and the connecting plate parts 147*d* are cut off at the portions of narrow parts 147*b* and 147*c* to be divided into two spring pieces 140*a* and 140*b*.

The spring member 140*x* is, similarly to the spring member 140*y*, formed by press working or etching processing with the use of a photo lithography technique to a metal thin plate. In this case, four cut-out parts 143 extending in the circumferential direction are formed between the movable body side fixing part 148 and the support body side fixing part 149, and four arm parts 140 extending in the circumferential direction are formed through the cut-out parts 143. In this embodiment, the four cut-out parts 143 are respectively extended in the circumferential direction and, in the example shown in FIGS. 13(*a*) and 13(*b*), the cut-out part 143 is extended so as to shift from an inner peripheral side to an outer peripheral side at a midway position in the clockwise direction CW. Therefore, a arm part 140 is formed by overlapped portions of the adjacent cut-out parts 143 in the circumferential direction so that its inner circumferential edge portion is defined by the portion of the cut-out part 143 which is located on the counterclockwise direction CCW side. The outer peripheral edge portion of the arm part 140 is defined by the portion of the cut-out part 143 which is located on the clockwise direction CW side.

In the spring member 140*x* structured as described above, all of the four cut-out parts 143 are extended in a slit-like shape. Therefore, a first slit part 141 is cut out on an inner side of the arm part 140 in the spring member 140*x* toward a connecting portion of the arm part 140 with the movable body side fixing part 148, and a second slit part 142 is cut out on an outer side of the arm part 140 toward a connecting portion of the arm part 140 with the support body side fixing part 149. A length dimension of the arm part 140 is determined to be, for example, from 3 mm to 5 mm by the cutting length of the first slit part 141 and the second slit part 142.

Also in the spring member 140*x* of the lens drive device 1 in this embodiment, the arm part 140 requires a spring constant with a high degree of accuracy. Therefore, in this embodiment, first, in a "cutting" process, as shown in FIG. 13(*b*), press working or etching processing utilizing a photo lithography technique is performed on a metal thin plate and the cut-out parts 143 and the like are formed in the thin plate to form the support body side fixing part 149, the movable body side fixing part 148, the arm parts 140, the frame 147 and the connecting plate parts 147*d*.

Next, in a "laser trimming" process, a spring constant of the arm part 140 which has been formed in the "cutting" process is measured and, on the basis of a measurement result of the spring constant, a shape and a dimension of the arm part 140 are changed by using a laser to correct the spring constant. Specifically, with respect to all of the four cut-out parts 143 shown in FIG. 13(*b*), a laser spot is irradiated at an end part of the second slit part 142 to perform partial cutting on a connecting portion of the arm part 140 with the support body side fixing part 149 so as to extend the second slit part 142. As a result, in all of the four arm parts 140, the cut portion 145 is formed by the laser in the connecting portion of the arm part 140 with the support body side fixing part 149, and a length dimension of the arm part 140 is extended by a dimension cut by the laser. In order to perform cutting by the laser, a cutting dimension is determined on the basis of a measured result of the spring constant of the arm part 140.

Other structures of the spring member 140x are similar to the spring member 140y and thus their descriptions are omitted. In the spring member 140x, a spring constant of the arm part 140 is corrected to an optimum value by means of that the cut portion 145 is formed by using a laser in the laser trimming process. Therefore, the spring member 140x is capable of obtaining similar effects to the spring member 140y such as a spring constant with a high degree of accuracy.

In the two spring members 140x and 140y, the plate thickness, the length and the extended direction of the arm part 140 may be the same as each other but they may be different from each other. Further, in the embodiment, the laser trimming is performed on all of the four arm parts 140 which are formed in the spring members 140x and 140y. However, the laser trimming may be performed on only one of the four arm parts 140. Further, at least an embodiment of the present invention may be applied to a spring member in which the arm part 140 is curved or bent at its midway position.

In addition, in the embodiment described above, the present invention is applied to the spring members 140x and 140y which are used in the lens drive device 1. However, the present invention may also be applied to a spring member which is mounted on other devices.

The lens drive device 1 may be mounted on various electronic equipments in addition to a cell phone with a camera. For example, the lens drive device 1 may be mounted on a PHS, a PDA, a bar code reader, a thin-type digital camera, a monitoring camera, a camera for backward view of a vehicle, a door having an optical authentication function, or the like.

The lens drive device in accordance with an embodiment of the present invention is effective for attaining reduction of a height of an apparatus and for enhancing reliability of an apparatus.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
a movable body which is provided with a lens and which is movable in an optical axis direction;
a support body which supports the movable body through a spring member; and
a magnetic drive mechanism which includes a coil that is held on the movable body and which drives the movable body in the optical axis direction;
wherein the movable body includes a sleeve which is provided with the lens, the sleeve is mounted movably in the optical axis direction by a first plate spring which is mounted on a front end face side in the optical axis direction and by a second plate spring which is mounted on a rear end face side in the optical axis direction;
one of the first plate spring and the second plate spring comprises two spring pieces which are electrically separated from each other, and the two spring pieces are formed with coil connecting parts to which the winding start part and the winding end part of the coil are electrically connected;
wherein each of the two spring pieces includes a circular arc-shaped sleeve side fixing part mounted on the sleeve, a support body side fixing part mounted on the support body, and an arm part which is formed between the circular arc-shaped sleeve side fixing part and the support body side fixing part for restricting movement in the optical axis direction of the sleeve;
the coil connecting part is formed at a tip end part of the circular arc-shaped sleeve side fixing part, and an accommodating recessed part for accommodating the coil connecting part is formed on an end face in the optical axis direction of the sleeve; and the coil connecting part is capable of being bent, and the movable body is provided with an accommodating part for accommodating the coil connecting part which has been bent; and
wherein the coil connecting part is bent so that they are accommodated in the accommodating recessed part as an accommodating part for the coil connecting part which is formed on the rear end face of the sleeve.

2. The lens drive device according to claim 1, wherein the coil connecting part is disposed in a vicinity of a positioning hole for positioning the spring piece to the movable body.

3. The lens drive device according to claim 1, wherein each of the two spring pieces is formed with a positioning hole for positioning the spring piece to the sleeve in a vicinity of the tip end part of the circular arc-shaped sleeve side fixing part, and
the circular arc-shaped sleeve side fixing part of the spring piece is positioned and fixed to the sleeve through the positioning hole and the coil connecting part is accommodated in the accommodating recessed part.

4. The lens drive device according to claim 1, wherein the coil connecting part is adhesively fixed to the accommodating recessed part in a state where the coil connecting part is covered with an adhesive.

5. The lens drive device according to claim 4, wherein the coil connecting part includes a coil binding part where the coil is bound and soldered,
the adhesive is applied so as to cover at least the coil binding part and a portion where an insulating layer of the coil has been melted at the time of soldering, and
the coil connecting part and the coil are adhesively fixed to the accommodating recessed part with the adhesive.

6. The lens drive device according to claim 1, wherein the coil connecting part is adhesively fixed to the accommodating part with an adhesive.

7. The lens drive device according to claim 6, wherein the coil connecting part includes a coil binding part where the coil is bound and soldered,
the adhesive is applied so as to cover at least the coil binding part and a portion where an insulating layer of the coil has been melted at the time of soldering, and
the coil connecting part and the coil are adhesively fixed to the accommodating part with the adhesive.

8. A lens drive device comprising:
a support body;
a movable body which is provided with a lens;
a spring member which movably supports the movable body along an optical axis of the lens;
wherein the spring member comprises:
a support body side fixing part which is fixed to the support body;
a movable body side fixing part which is fixed to the movable body; and a plurality of plate spring-shaped arm parts which connects the support body side fixing part and the movable body side fixing part; and wherein at least one of the plurality of the arm parts is provided with a cut portion formed by a laser in an edge part;

wherein an edge part of the plate spring-shaped arm part except the cut portion formed by the laser is a cut portion by press working or by etching processing in which a photolithography technique is used and wherein the cut portion of the spring member formed by the laser is formed so that a cut-out part for forming the plate spring-shaped arm part is extended to lengthen a length dimension of the plate spring-shaped arm part.

9. The lens drive device according to claim 8, wherein the plate spring-shaped arm part is extended in a circumferential direction, the spring member is provided with a first slit part, which is cut out on an inner side of the plate spring-shaped arm part toward a connecting portion of the plate spring-shaped arm part with the movable body side fixing part, and a second slit part which is cut out on an outer side of the plate spring-shaped arm part toward a connecting portion of the plate spring-shaped arm part with the support body side fixing part, and the cut portion by the laser is formed so that the first slit part and/or the second slit part are extended to lengthen a length dimension of the plate spring-shaped arm part.

10. The lens drive device according to claim 9, wherein in each of the plurality of the plate spring-shaped arm parts, the first slit part located on the inner side of the plate spring-shaped arm part and the second slit part, which is located on the outer side of another arm part that is formed at an adjacent position in the circumferential direction with respect to the plate spring-shaped arm part, are formed as a continuous cut-out part which is connected in the circumferential direction.

11. The lens drive device according to claim 9, wherein the cut portion by the laser is formed so that the second slit part is extended to lengthen the length dimension of the plate spring-shaped arm part.

12. The lens drive device according to claim 9, wherein the movable body side fixing part is formed in a ring-shaped frame shape and with which a plurality of arm parts are connected, and the arm part is curved along the movable body side fixing part.

13. A manufacturing method for a lens drive device having a support body, a movable body provided with a lens, and a spring member movably supporting the movable body along an optical axis of the lens and, in which the spring member includes a support body side fixing part fixed to the support body, a movable body side fixing part fixed to the movable body, and a plurality of plate spring-shaped arm parts which connects the support body side fixing part and the movable body side fixing part, comprising:

in order to manufacture the spring member;

cutting a thin plate to form the support body side fixing part, the movable body side fixing part and the plurality of the arm parts, measuring a spring constant of the plate spring-shaped arm part which is formed by the cutting, and performing laser trimming in which a shape and/or a dimension of the plate spring-shaped arm part are changed by a laser according to a measurement result of the spring constant to correct the spring constant.

14. The manufacturing method according to claim 13, wherein the cutting is performed by press working or by etching processing using a photo lithography technique to the thin plate to form the support body side fixing part, the movable body side fixing part and the plurality of the plate spring-shaped arm parts.

15. A spring member comprising:

a support body side fixing part which is fixed to a support body;

a movable body side fixing part which is fixed to a movable body; and a plate spring-shaped arm part which connects the support body side fixing part with the movable body side fixing part;

wherein the plate spring-shaped arm part is provided with a laser cut portion which is formed by a laser in a part of an edge part of the plate spring-shaped arm part wherein an edge part of the plate spring-shaped arm part except the laser cut portion is a cut portion formed by press working or by etching processing in which a photolithography technique is used wherein the cut portion of the spring member formed by the laser is formed so that a cut-out part for forming the plate spring-shaped arm part is extended to lengthen a length dimension of the plate spring-shaped arm part.

16. A manufacturing method for a spring member having a support body side fixing part fixed to a support body, a movable body side fixing part fixed to a movable body, and a plate spring-shaped arm part which connects the support body side fixing part with the movable body side fixing part, comprising:

in order to manufacture the spring member;

cutting a thin plate to form the support body side fixing part, the movable body side fixing part and the plurality of the plate spring-shaped arm parts, measuring a spring constant of the plate spring-shaped arm part which is formed by the cutting, and performing laser trimming in which a shape and/or a dimension of the plate spring-shaped arm part are changed by a laser according to a measurement result of the spring constant to correct the spring constant.

17. The manufacturing method according to claim 16, wherein the cutting is performed by press working or by etching processing using a photo lithography technique to the thin plate to form the support body side fixing part, the movable body side fixing part and the plurality of the plate spring-shaped arm parts.

18. A lens drive device comprising:

a movable body which is provided with a lens and which is movable in an optical axis direction;

a support body which supports the movable body through a spring member; and a magnetic drive mechanism which includes a coil that is held on the movable body and which drives the movable body in the optical axis direction;

wherein the spring member includes a plurality of spring pieces which are electrically separated from each other, and the spring piece is formed with a coil connecting part to which one of a winding start part and a winding end part of the coil is electrically connected, and the coil connecting part is capable of being bent, and the movable body is provided with an accommodating part for accommodating the coil connecting part which has been bent;

wherein the coil connecting part is adhesively fixed to the accommodating part with an adhesive.

* * * * *